United States Patent
Narui et al.

(10) Patent No.: US 8,024,747 B2
(45) Date of Patent: Sep. 20, 2011

(54) OPTICAL DISC APPARATUS

(75) Inventors: Yoichi Narui, Matsudo (JP); Ikuo Nishida, Ebina (JP); Yoshiyuki Tanaka, Kawasaki (JP); Hisahiro Miki, Chigasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 333 days.

(21) Appl. No.: 12/430,165

(22) Filed: Apr. 27, 2009

(65) Prior Publication Data

US 2009/0288107 A1 Nov. 19, 2009

(30) Foreign Application Priority Data

May 15, 2008 (JP) ................... 2008-128062

(51) Int. Cl.
*G11B 17/051* (2006.01)
(52) U.S. Cl. ...................................... 720/623
(58) Field of Classification Search ............. 720/623
See application file for complete search history.

(56) References Cited

U.S. PATENT DOCUMENTS

| | | | | |
|---|---|---|---|---|
| 7,634,781 B2 * | 12/2009 | Hoshinaka et al. | ........... | 720/623 |
| 7,823,171 B2 * | 10/2010 | Yokochi et al. | ........... | 720/623 |
| 7,900,220 B2 * | 3/2011 | Chiou et al. | ........... | 720/622 |
| 2005/0144629 A1 | 6/2005 | Fujisawa et al. | | |
| 2006/0190949 A1 * | 8/2006 | Shimomae | ........... | 720/621 |
| 2007/0174857 A1 * | 7/2007 | Lee | ........... | 720/624 |
| 2008/0005759 A1 | 1/2008 | Omori et al. | | |
| 2008/0010650 A1 * | 1/2008 | Fujisawa | ........... | 720/623 |
| 2008/0163274 A1 * | 7/2008 | Eguchi | ........... | 720/623 |

FOREIGN PATENT DOCUMENTS

| | | |
|---|---|---|
| JP | 2002-352498 | 12/2002 |
| JP | 2005-190553 | 7/2005 |
| JP | 2005-196908 | 7/2005 |
| JP | 2006-236436 | 9/2006 |
| JP | 2008-004215 | 1/2008 |

* cited by examiner

*Primary Examiner* — Mark Blouin
(74) *Attorney, Agent, or Firm* — Antonelli, Terry, Stout & Kraus, LLP.

(57) ABSTRACT

An optical disc apparatus including first to fourth disc guides. At the end of disc loading, the first one, in a fixed position, contacts a peripheral side face of the optical disc at a first point thereon to support the disc; the second one has a plane opposite to the peripheral side face which contacts the peripheral side face of the optical disc at a second point to support the disc while restrained from moving away from the side face; the third one contacts the peripheral side face of the optical disc at a third point to support the disc while biased by a spring; and the fourth one contacts the side face at a fourth point while biased by a spring to support the disc, and is restrained from moving against the resilience of the spring. The disc, supported by those disc guides, is chucked by a clamper.

10 Claims, 23 Drawing Sheets

OPTICAL DISC APPARATUS

CLAIM OF PRIORITY

The present application claims priority from Japanese patent application serial No. P2008-128062, filed on May 15, 2008, the content of which is hereby incorporated by reference into this application.

BACKGROUND

1. Technical Field

The present invention relates to an optical disc apparatus and more particularly to a structure which supports an optical disc by disc guides when a clamper chucks the optical disc.

2. Description of the Related Art

Conventionally, in a slot-in optical disc apparatus, as an optical disc is inserted into the apparatus, it is supported by disc guide members at four points on the peripheral side face of the disc, namely two forward points in the disc loading direction, one backward point in the disc loading direction, and one lateral point of the inserted disc and a damper begins moving into the center hole of the disc to chuck it. Particularly two disc guide members on the peripheral side face of the disc support the optical disc while they are biased by springs.

Among conventional techniques which are related to the present invention and described in patent documents are techniques disclosed in JP-A No. 2005-196908, JP-A No. 2002-352498, JP-A No. 2008-04215, and JP-A No. 2005-190553. JP-A No. 2005-196908 describes a slot-in disc apparatus which has a low friction sheet stuck to the inner surface of the top case in order to protect the disc surface from scratching and realize a more low-profile apparatus body. JP-A No. 2002-352498 describes a technique for a thinner smaller disc apparatus that a connector is disposed on the rear face of the chassis exterior composed of a base and a cover, a traverse and a printed circuit board are disposed on the base, the traverse is disposed near the disc insertion slot of the chassis exterior and the printed circuit board is disposed near the connector. In this technique, a disc loaded in the apparatus is supported by disc guide 81 and guides 182, 101 and 112. JP-A No. 2008-04215 describes a slot-in disc drive in which centering of a disc 2 is performed by a first centering member 51 and a second centering member 220 which are position-regulated with respect to a main chassis, and a deck arm 200 for biasing the disc 2 toward a disc loading/unloading slot 19. JP-A No. 2005-190553 describes a slot-in disc apparatus with a safety mechanism which prevents the clamp head of a spindle motor from colliding against a disc surface and damaging it if the apparatus mistakes a disc forcedly pulled out in the course of loading for a normally loaded disc. The safety mechanism, driven by the disc periphery, enables clamping when the disc is in a clampable position and disables clamping when the disc is not in a clampable position and the disc loaded in the apparatus is supported by a holder 18 at the tip of a disc support arm 17 and an attracting arm 50.

SUMMARY

In any of the above conventional techniques, if a vibration or impact is given to the apparatus or the apparatus is in such a position that its weight concentrates on the forward side in the disc loading direction, it may happen that when a disc is placed in a prescribed position and ready to be chucked, a disc guide for supporting the peripheral side face of the disc, located forward in the disc loading direction, shifts forward in the disc loading direction against the resilience of the biasing spring and consequently the disc deviates from the above prescribed position. If the disc is not in the prescribed position, the damper would be unable to chuck the disc normally, causing a chucking failure. A disc guide biased by a spring with lower resilience would cause more deviation from the prescribed disc position.

In view of the above circumstances concerning the above conventional techniques, the problem to be solved by the present invention is to provide an optical disc apparatus in which, even if an external force such as vibration or impact is given to the apparatus or the apparatus is in such a position that its weight concentrates on the forward side in the disc loading direction, the optical disc placed in a prescribed position before chucking is held in that position securely so as to ensure that the disc is normally chucked without a chucking failure.

An object of the present invention is to solve the above problem and provide an optical disc apparatus which operates reliably.

The present invention concerns a technique which solves the above problem and achieves the above object.

According to one aspect of the invention, an optical disc apparatus includes the following components which function as follows at the end of loading of an optical disc: a first disc guide which, placed in a fixed position, contacts the peripheral side face of the optical disc at a first point thereon to support the disc; a second disc guide having a plane opposite to the peripheral side face of the optical disc which contacts the peripheral side face of the optical disc at a second point thereon to support the disc while restrained from moving away from the side face; a third disc guide which contacts the peripheral side face of the optical disc at a third point thereon to support the disc while biased by a spring; and a fourth disc guide which contacts the peripheral side face of the optical disc at a fourth point thereon while biased by a spring to support the disc, and is restrained from moving against the resilience of the spring. Here, a damper is put into a center hole of the optical disc supported by the first, second, third and fourth disc guides to chuck the optical disc. At the end of loading, the optical disc is centered by the first, second and fourth disc guides so that it is ready to be chucked. At the end of loading, by locking a member with the second disc guide provided thereon by a lock arm turning on a fulcrum on the chassis and an opening in a plane of the chassis, the second disc guide is restrained from moving away from the side face. After that, in chucking the optical disc, while the damper is placed in the optical disc's center hole, as the member is released from the lock arm by movement of a cam member engaged with the chassis, turned on a fulcrum and locked by the cam member and locked by the cam member, the second disc guide moves to an escape position and is held in the escape position away from the peripheral side face of the optical disc at the second point thereon. At the end of loading, the fourth disc guide is restrained from moving against the resilience of the spring by a pin on a lever member with the fourth disc guide provided thereon contacting an end face of a cam groove in the cam member engaged with the chassis, to support the optical disc.

BRIEF DESCRIPTION OF THE DRAWINGS

FIGS. 12A, 12B and 12C show a second disc guide of the optical disc apparatus shown in FIG. 1 in its initial state, in which FIG. 12A is a perspective view of the disc guide L308 and its vicinity on the disc loading side (+Z side), FIG. 12B is a perspective view of the lock arm 322 and its vicinity on the undersurface (−Z side), and FIG. 12C shows the locking mechanism of the lock arm 322 in enlarged form;

DETAILED DESCRIPTION OF THE PREFERRED EMBODIMENT

Next, the preferred embodiment of the present invention will be described referring to the accompanying drawings.

Figure 1:
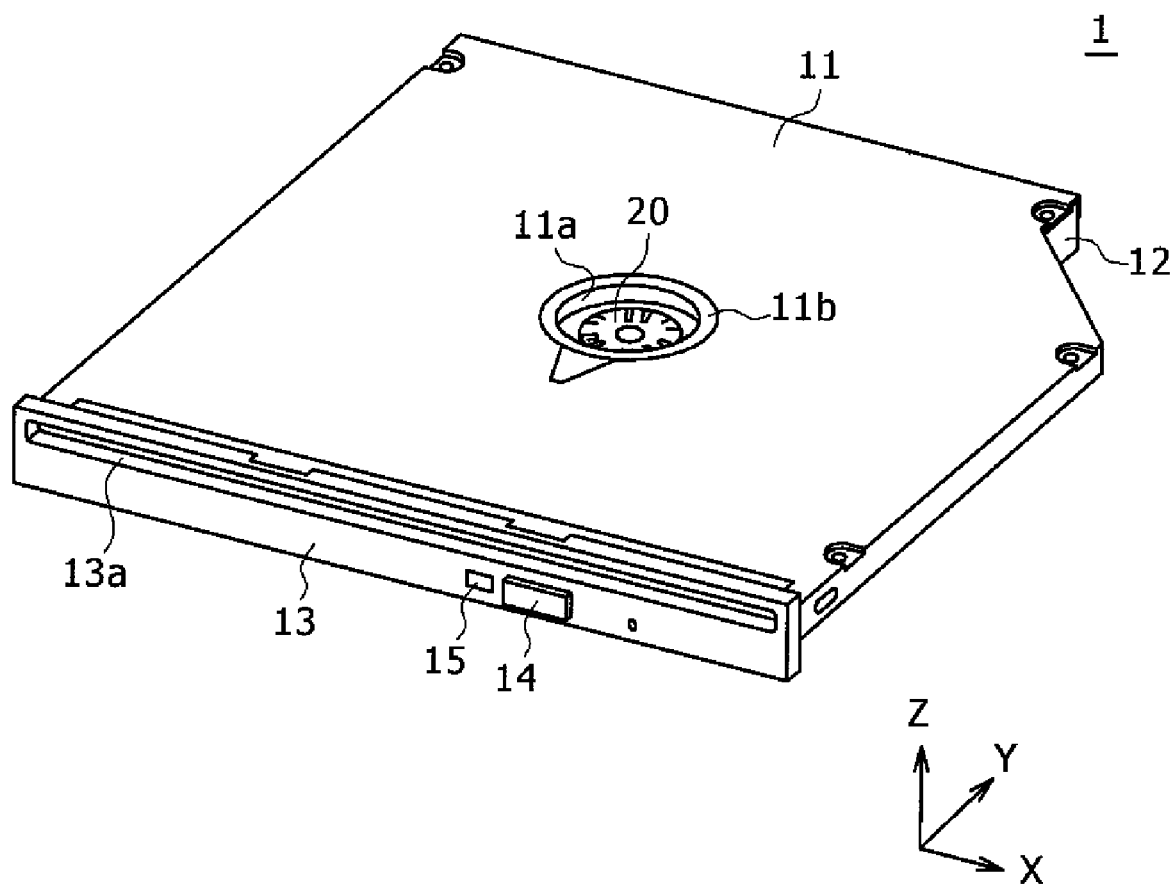
FIG. 1 shows the appearance of an optical disc apparatus according to an embodiment of the present invention.
Figure 2:
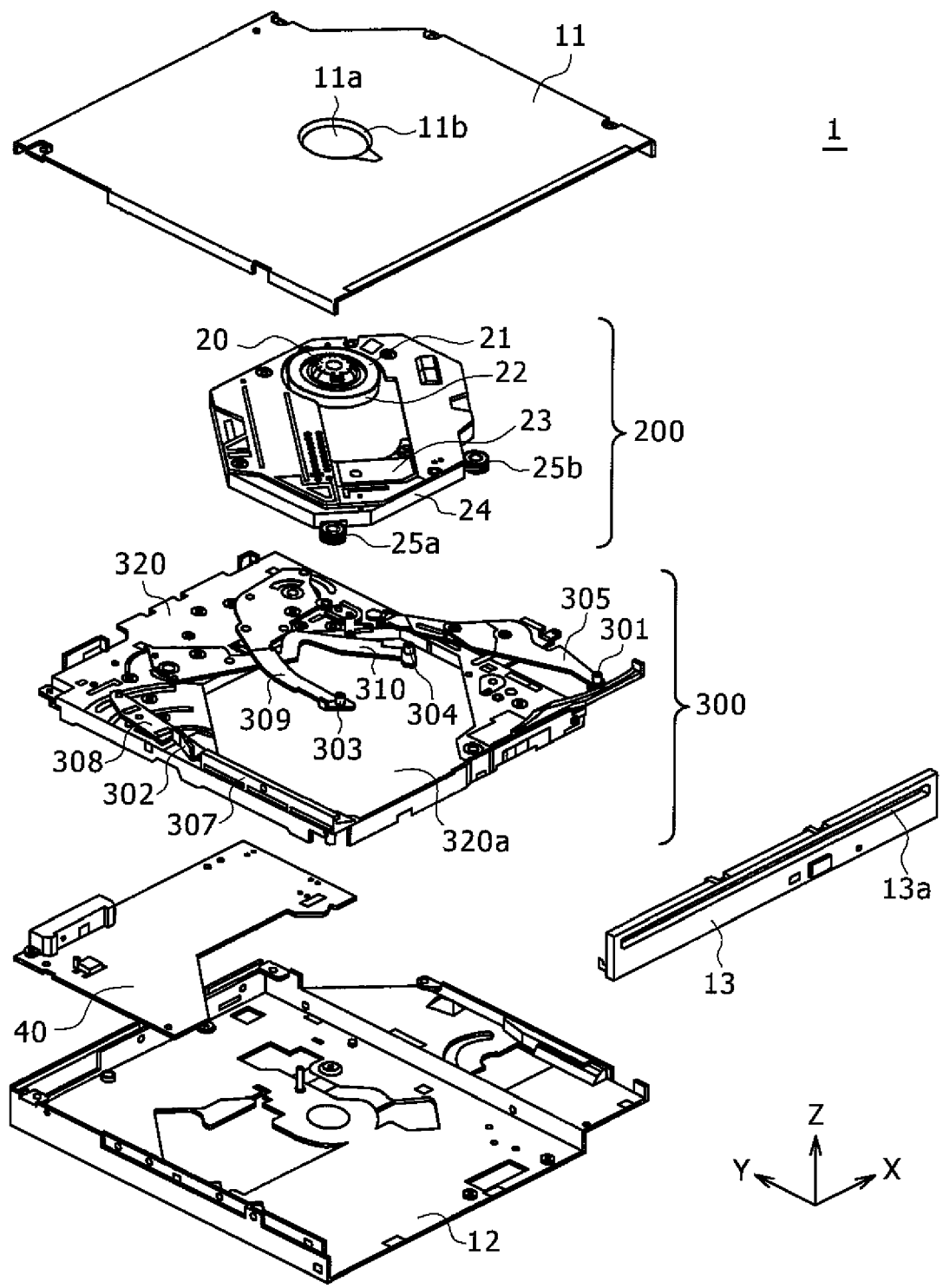
FIG. 2 is an exploded view of the optical disc apparatus shown in FIG. 1 on a unit-by-unit basis.
Figure 3:
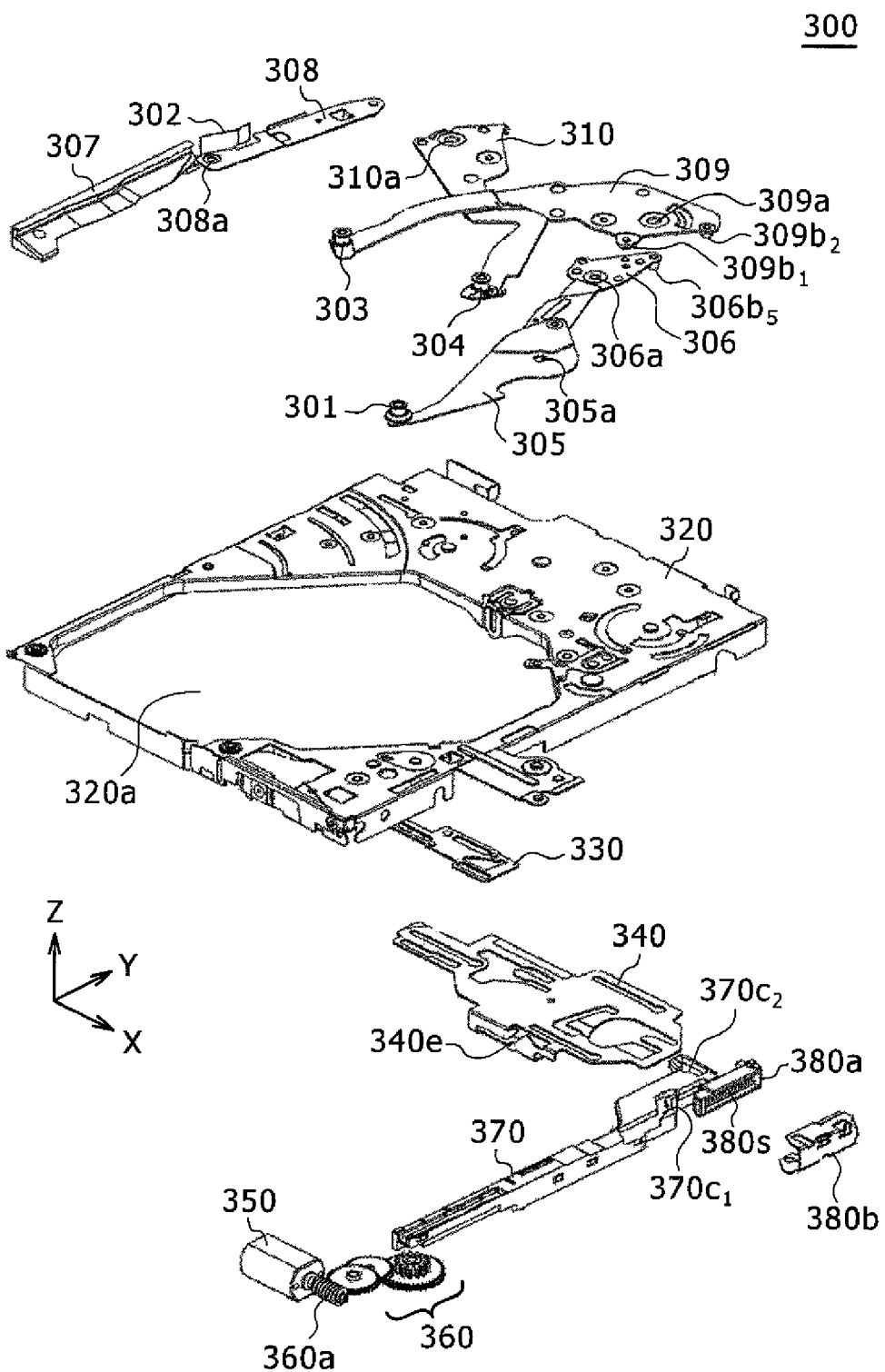
FIG. 3 is an exploded perspective view of a loading unit of the optical disc apparatus shown in FIG. 1 as seen obliquely from above.
Figure 4:
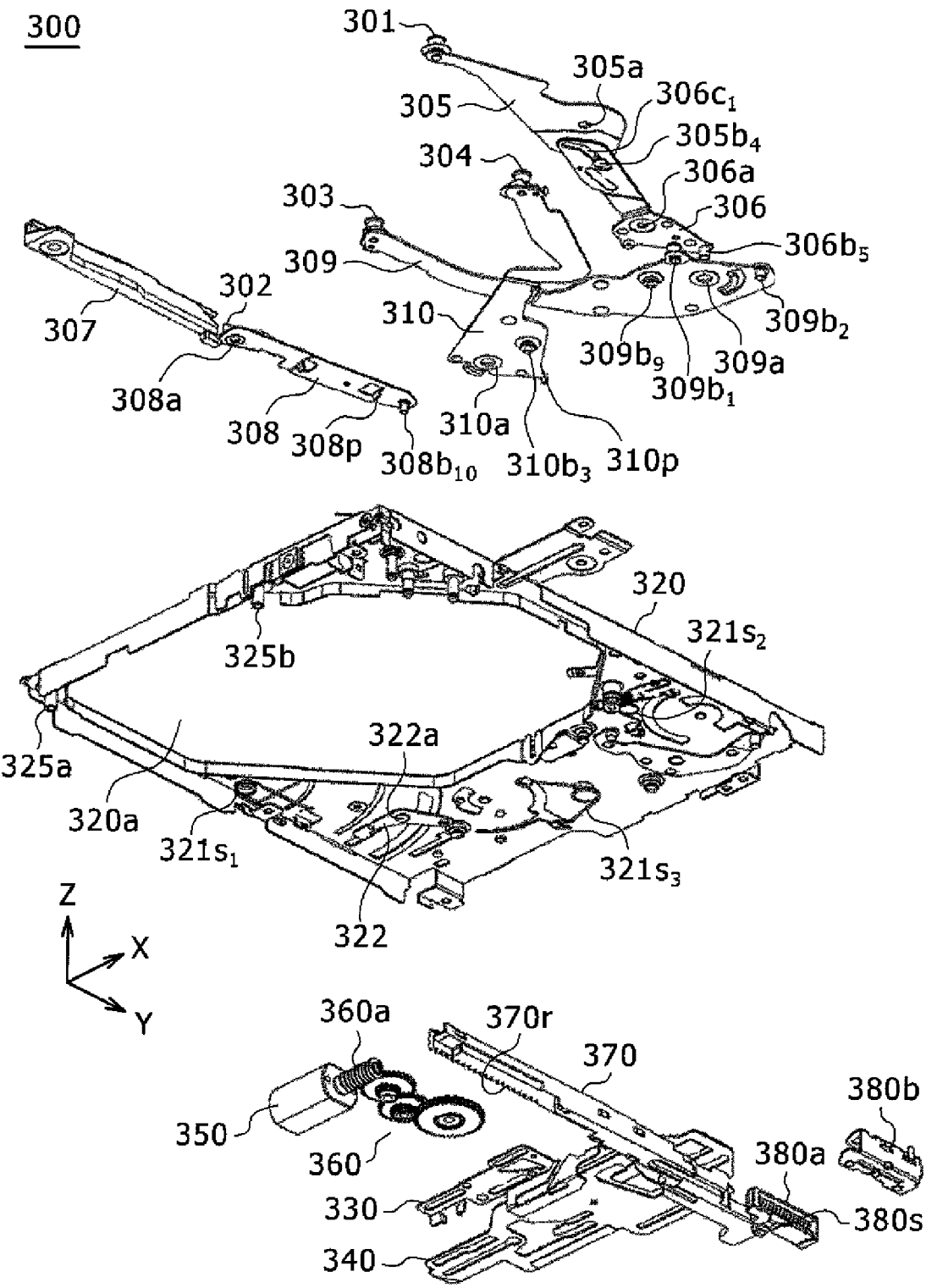
FIG. 4 is an exploded perspective view of the loading unit as seen obliquely from below.
Figure 5:
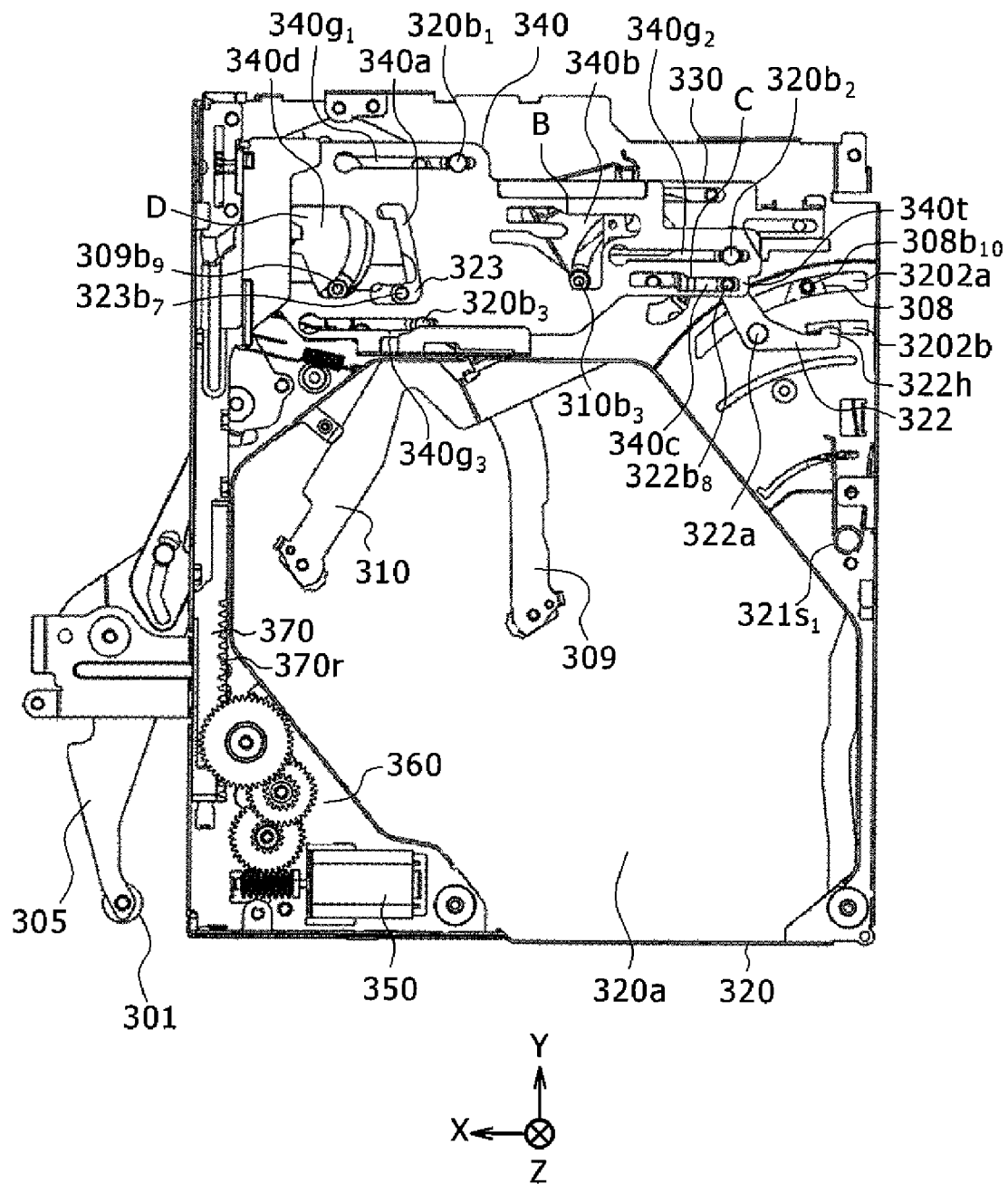
FIG. 5 is a plan view of the undersurface of the loading unit.
Figure 6:
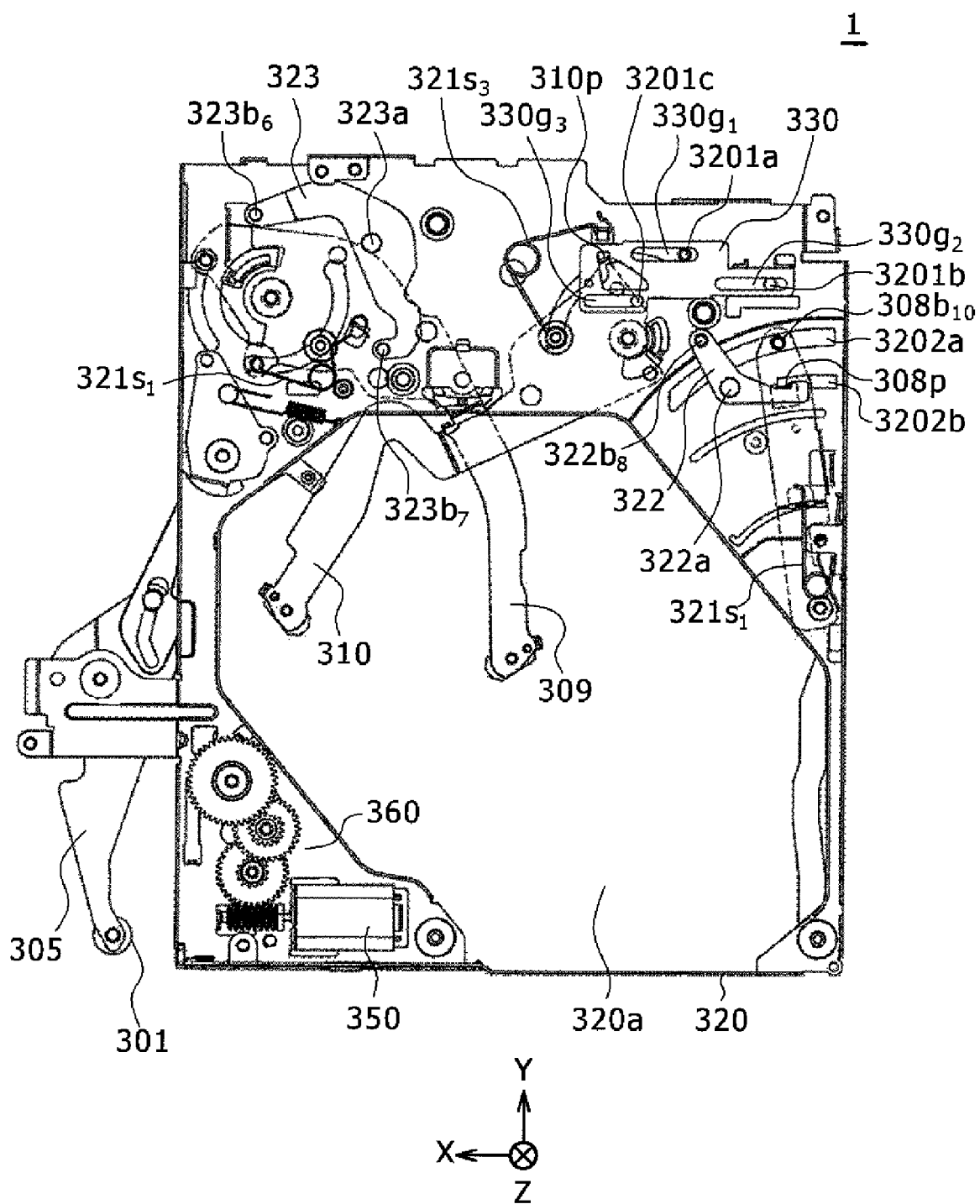
FIG. 6 is a plan view showing components on the undersurface of the loading unit.
Figure 7:
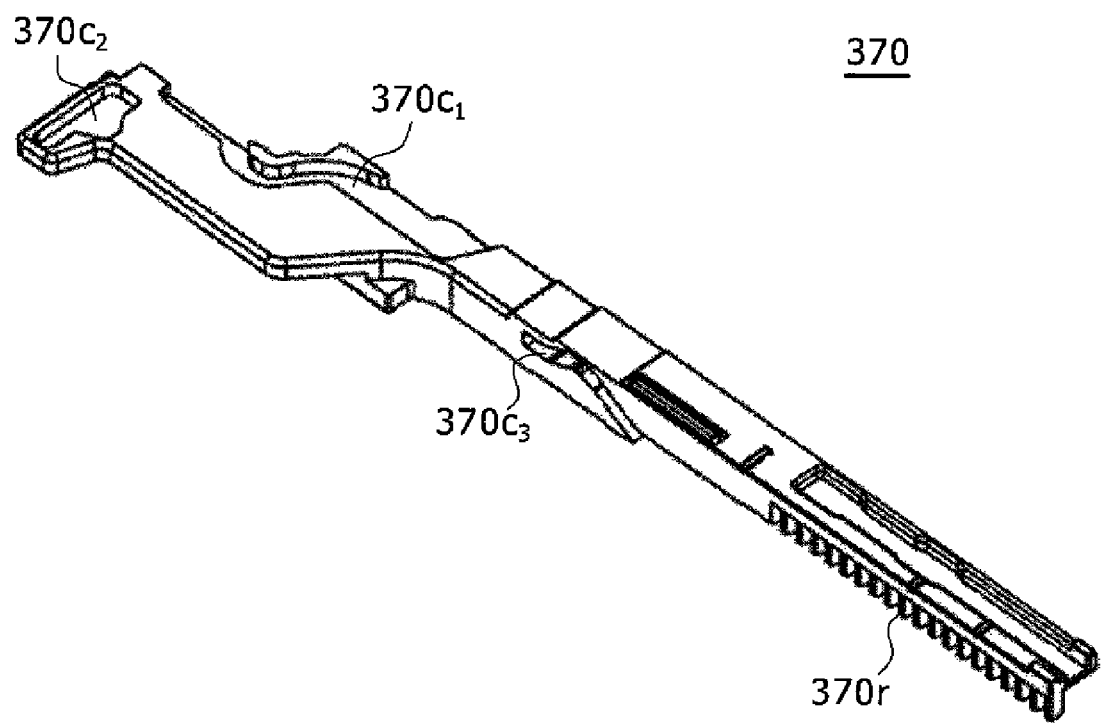
FIG. 7 is a perspective view of a function lever of the optical disc apparatus shown in FIG. 1.
Figure 8:
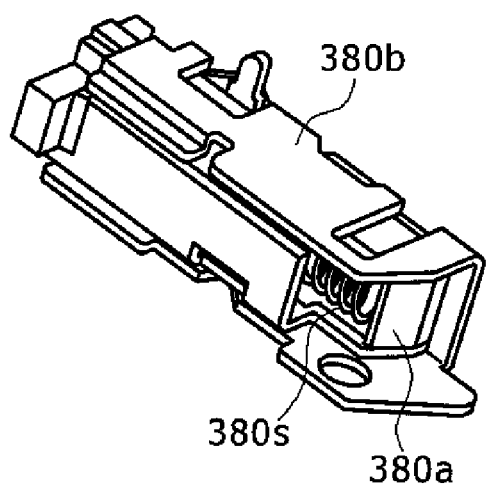
FIG. 8 is a perspective view showing an eject lever and an eject plate of the optical disc apparatus shown in FIG. 1.
Figure 9:
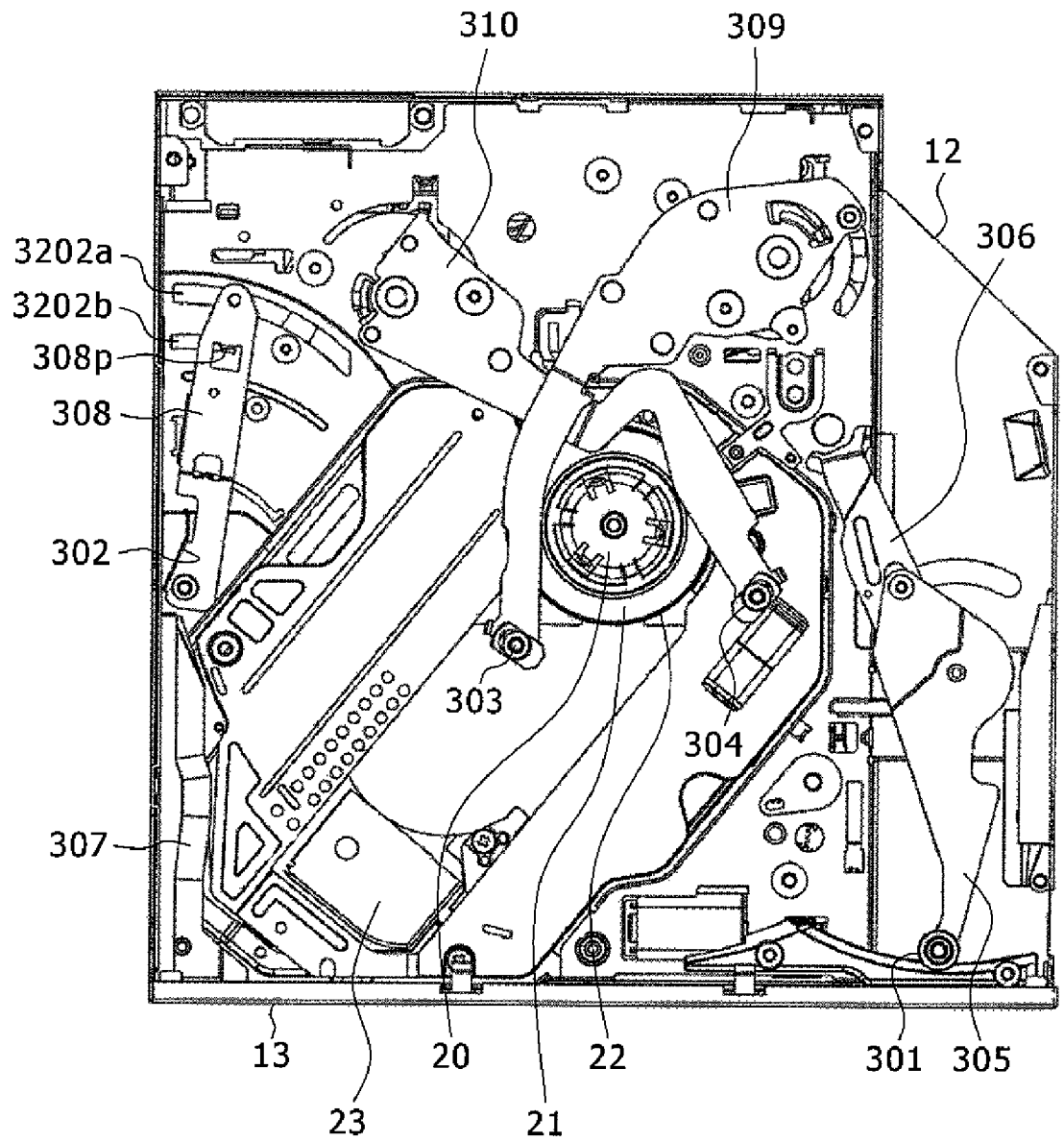
FIG. 9 is a plan view showing the disc loading side of the apparatus shown in FIG. 1 in its initial state with its top cover removed.
Figure 10:
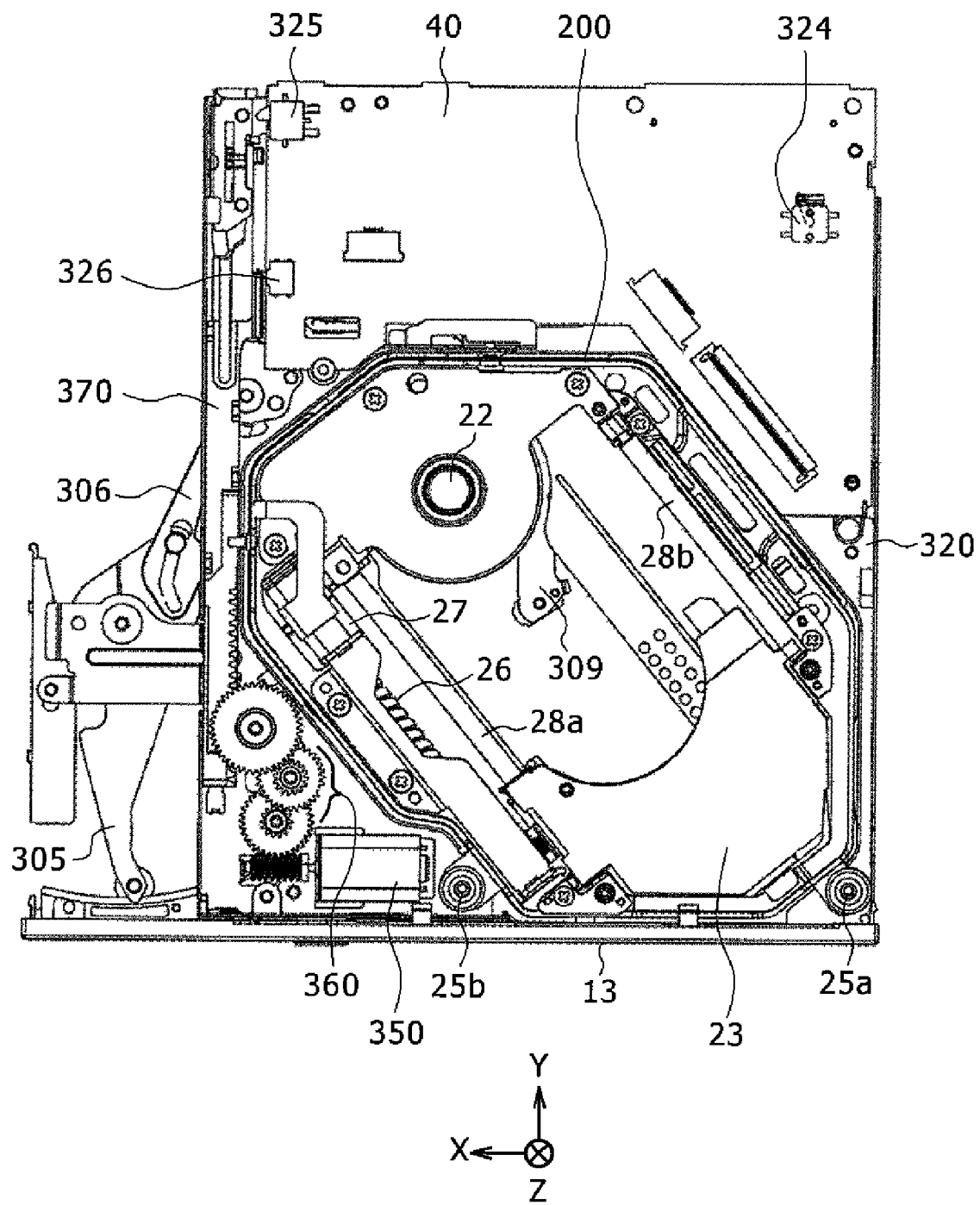
FIG. 10 is a plan view showing the undersurface of the optical disc apparatus shown in FIG. 1 in its initial state with its bottom case removed.
Figure 11:
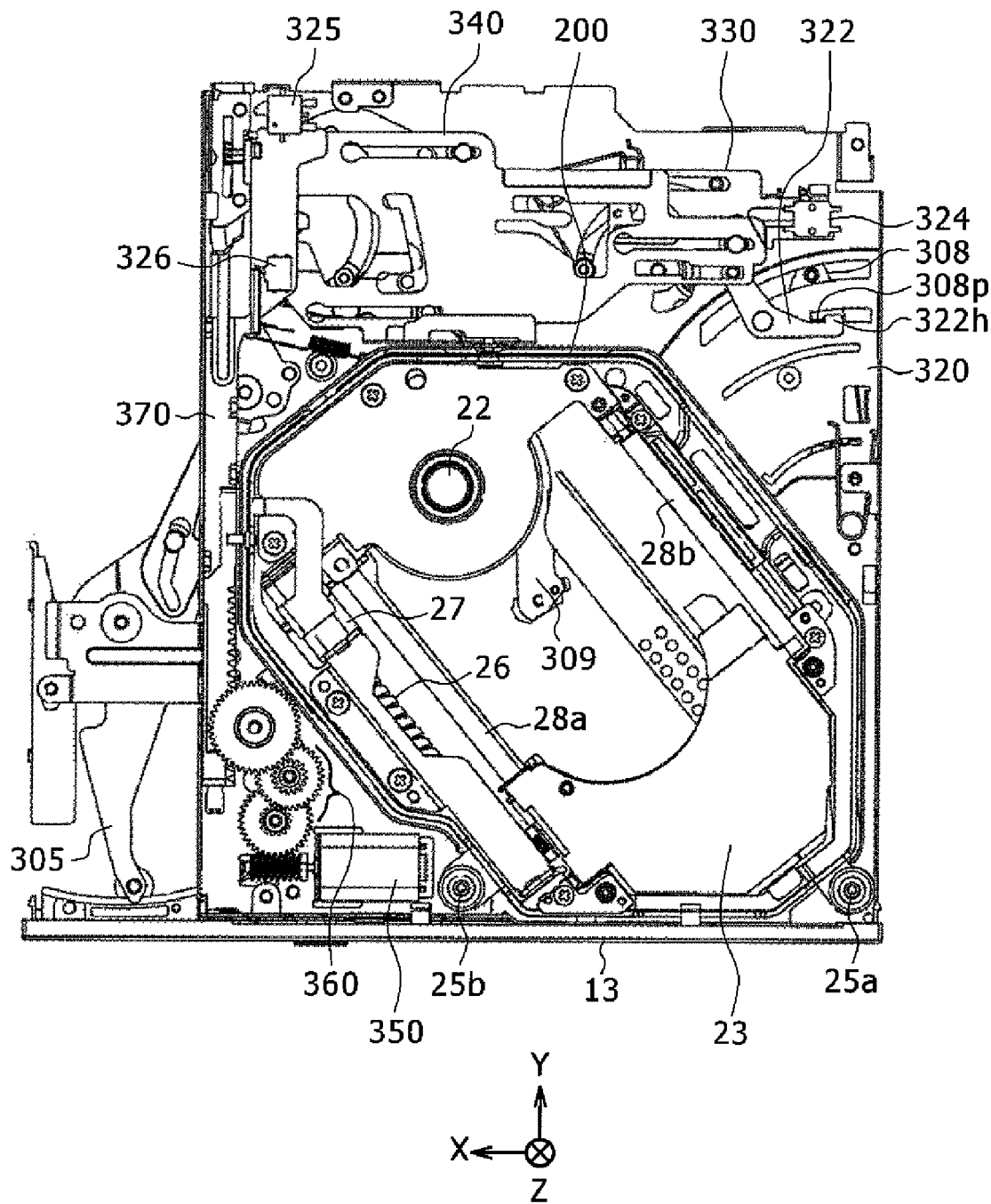
FIG. 11 is a plan view showing the undersurface of the optical disc apparatus shown in FIG. 1 in its initial state with its bottom case and control board removed.
Figure 12A:
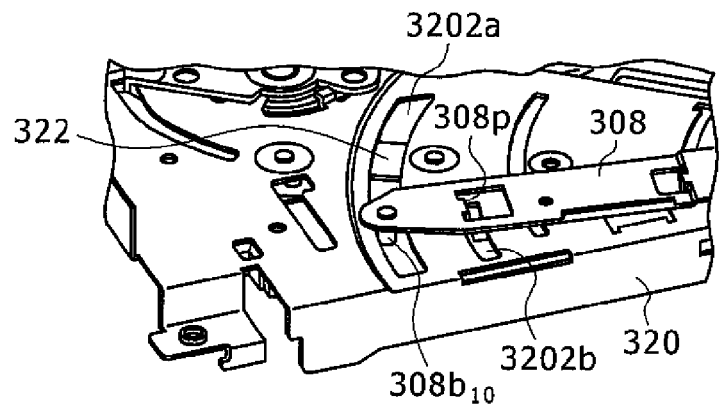
Figure 12B:
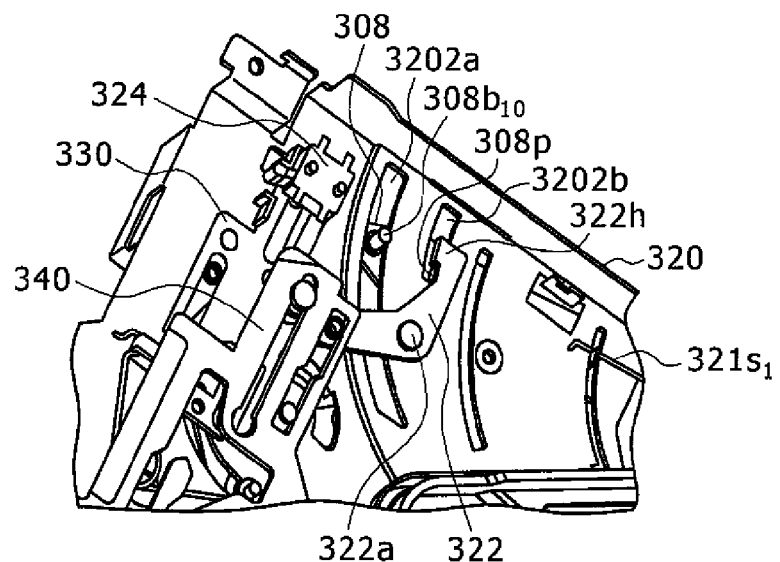
Figure 12C:
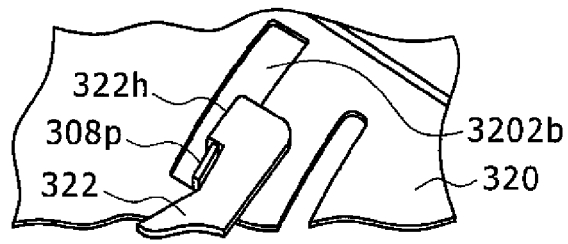
Figure 13:
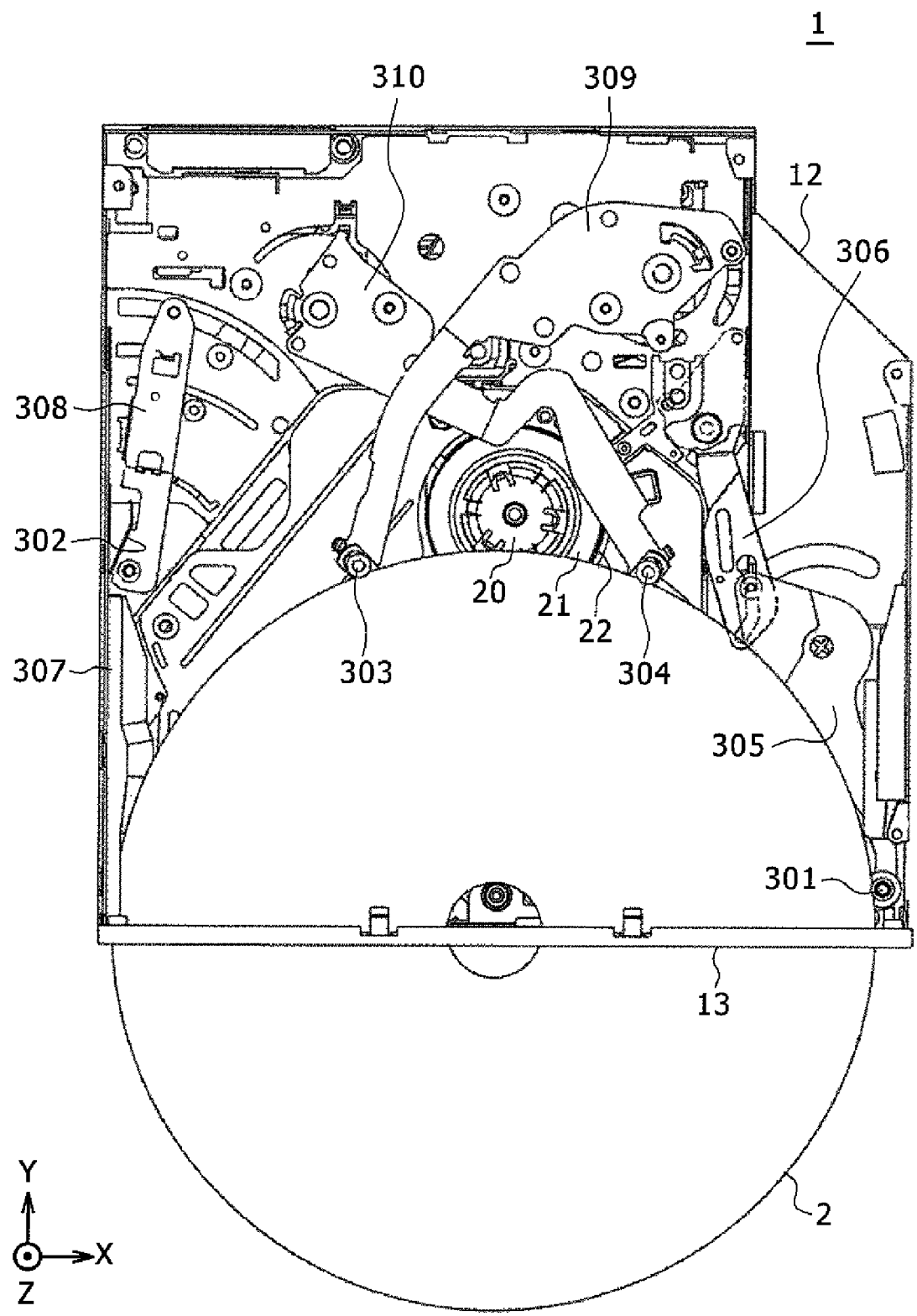
FIG. 13 is a plan view showing the disc loading side of the optical disc apparatus shown in FIG. 1 where the optical disc is so inserted as to come into contact with a disc lever.
Figure 14:
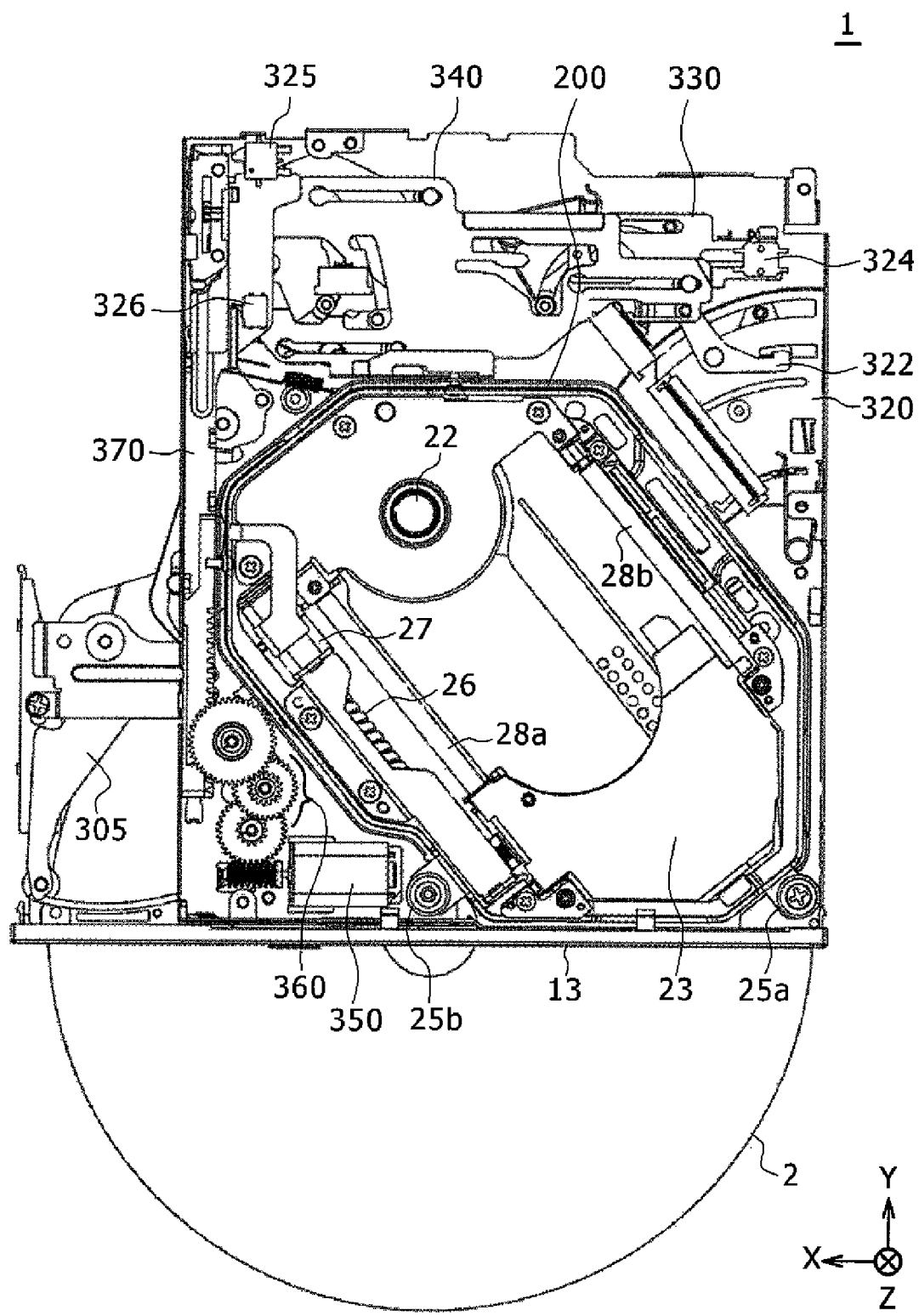
FIG. 14 is a plan view showing the undersurface of the optical disc apparatus shown in FIG. 1 where the disc is inserted as shown in FIG. 13.
Figure 15:
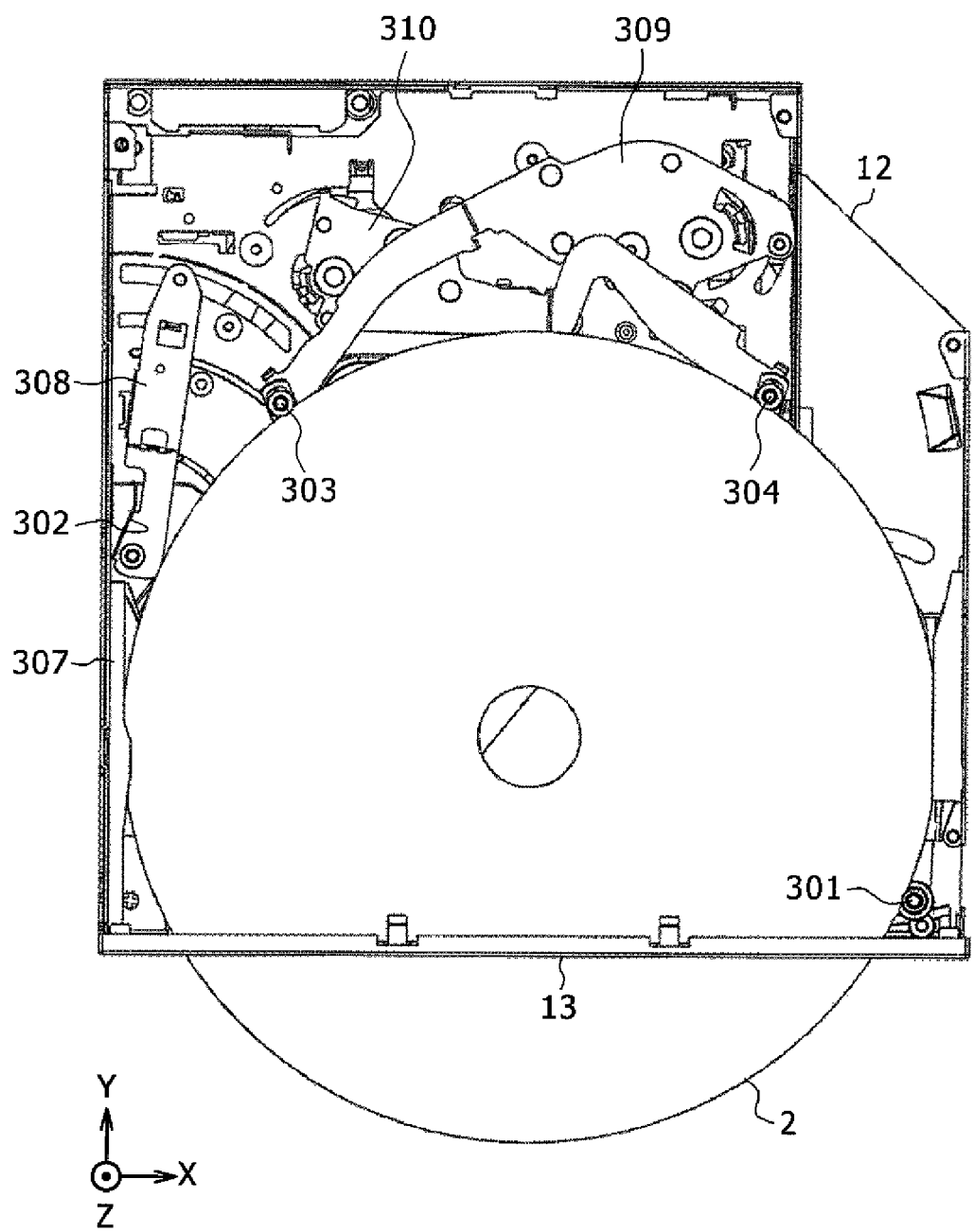
FIG. 15 is a plan view showing the disc loading side of the optical disc apparatus shown in FIG. 1 where the disc is inserted deep enough to turn on a loading switch.
Figure 16:
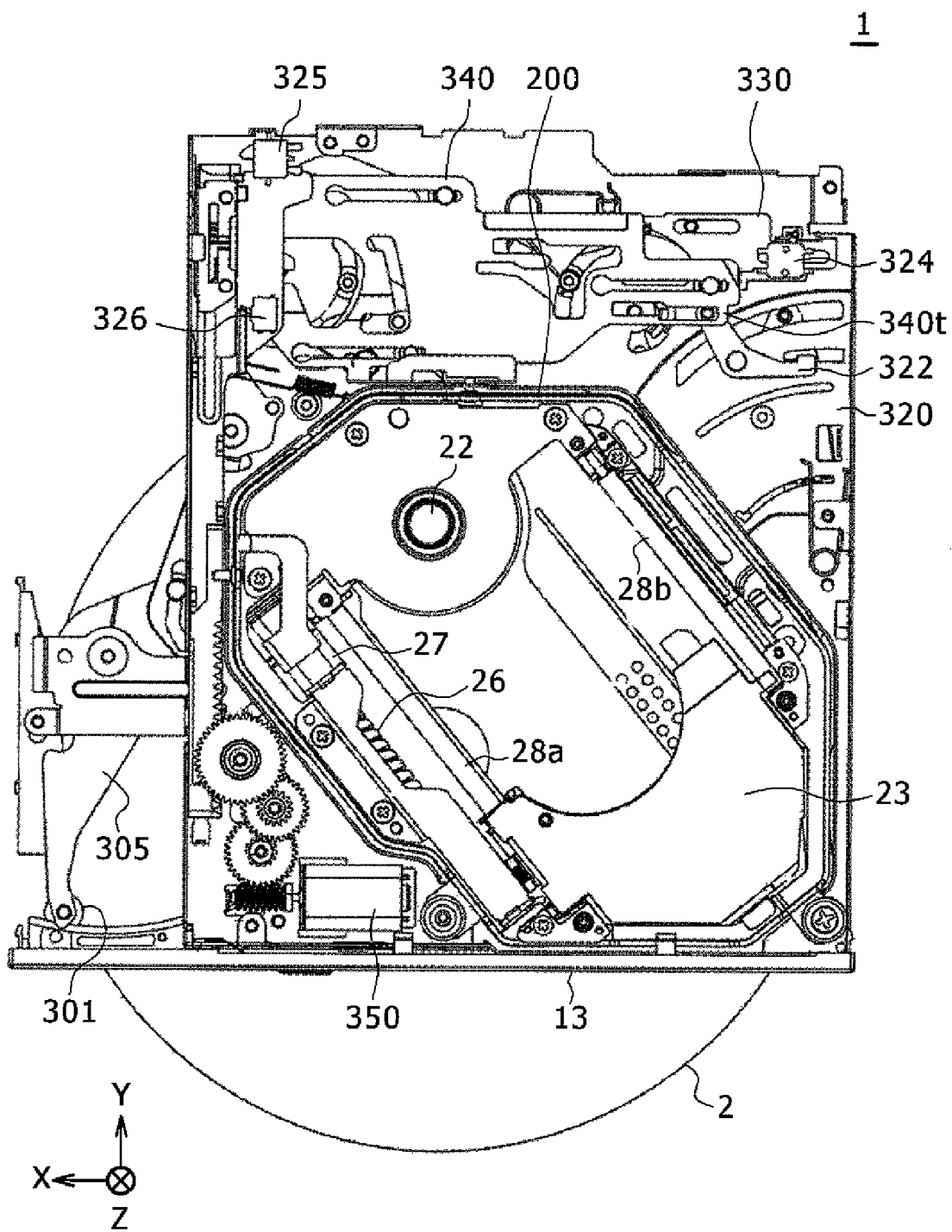
FIG. 16 is a plan view showing the undersurface of the optical disc apparatus where the disc is inserted as shown in FIG. 15.
Figure 17:
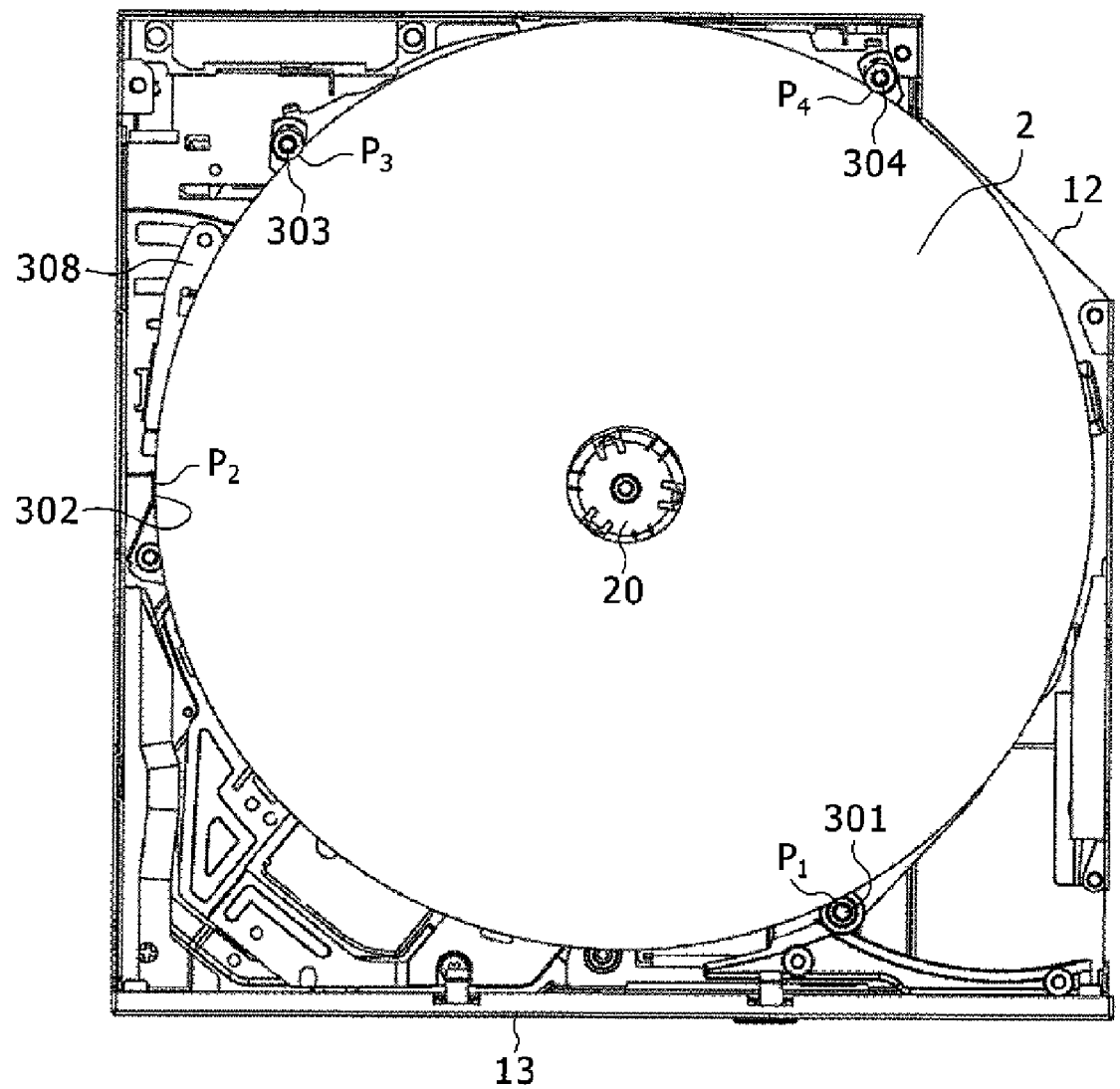
FIG. 17 is a plan view showing the disc loading side of the optical disc apparatus shown in FIG. 1 where the optical disc is pulled into the apparatus by a loading motor and positioned.
Figure 18:
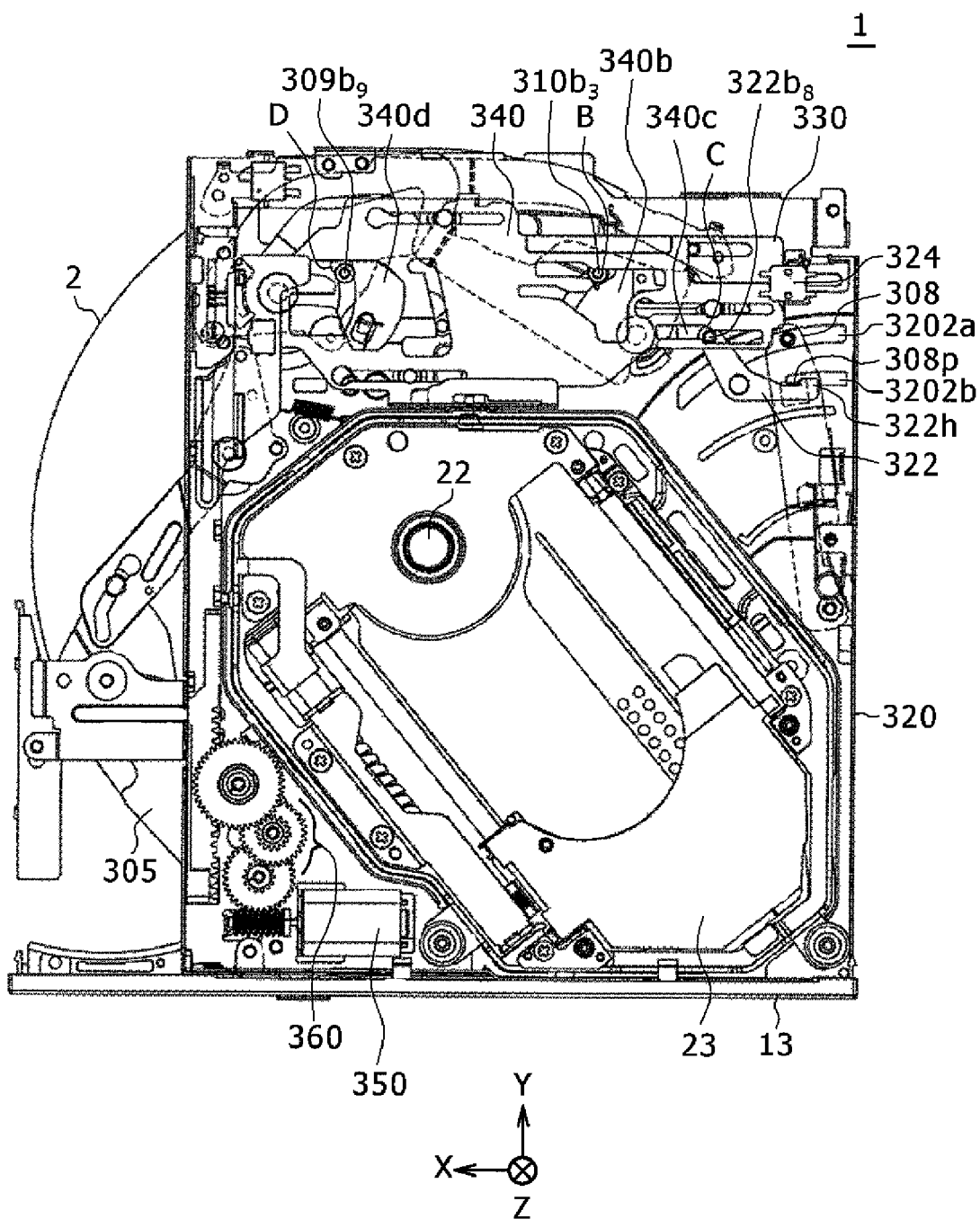
FIG. 18 is a plan view showing the undersurface of the optical disc apparatus where the disc is inserted as shown in FIG. 17.
Figure 19:
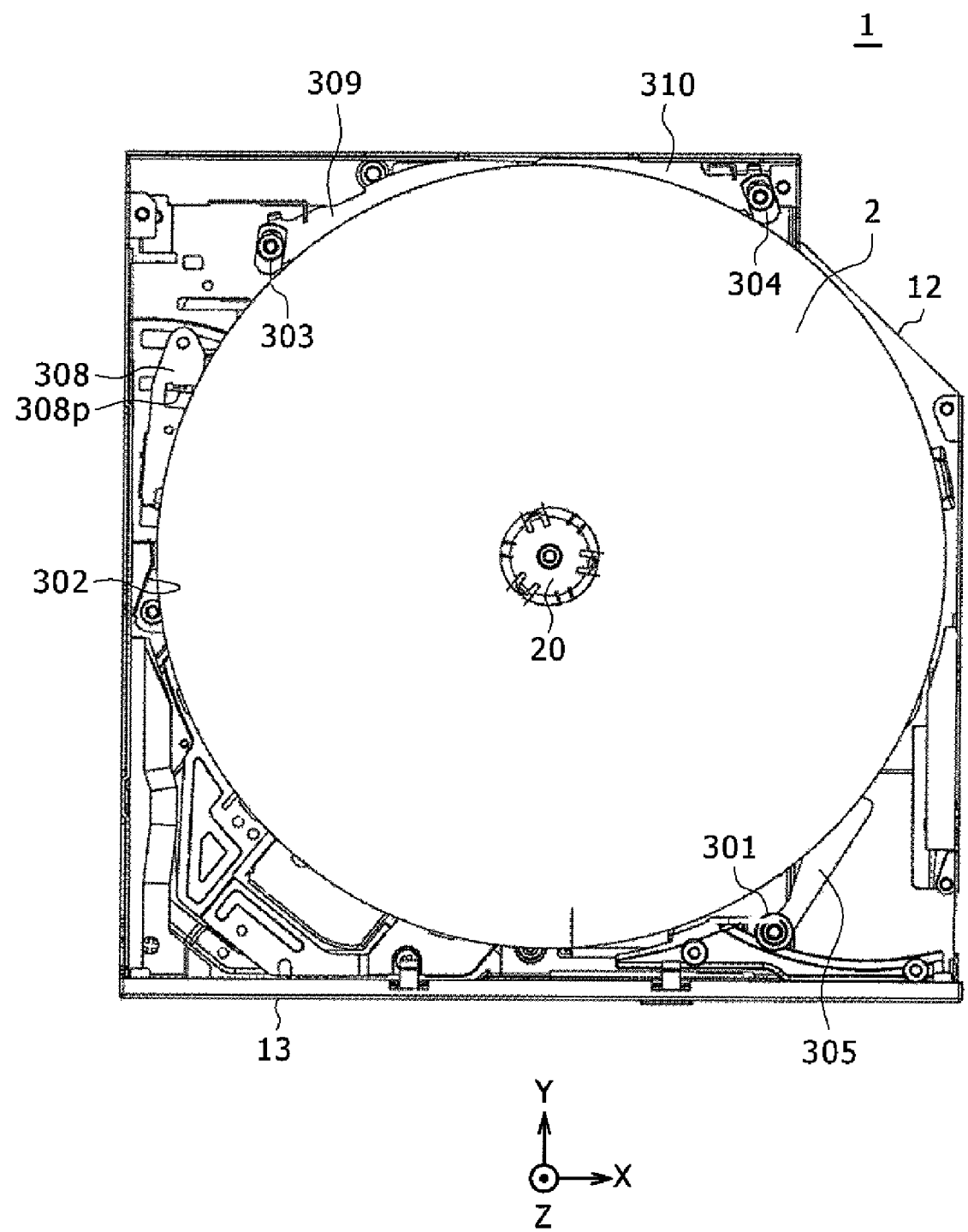
FIG. 19 is a plan view showing the disc loading side of the optical disc apparatus shown in FIG. 1 where the optical disc is chucked by a clamper.
Figure 20:
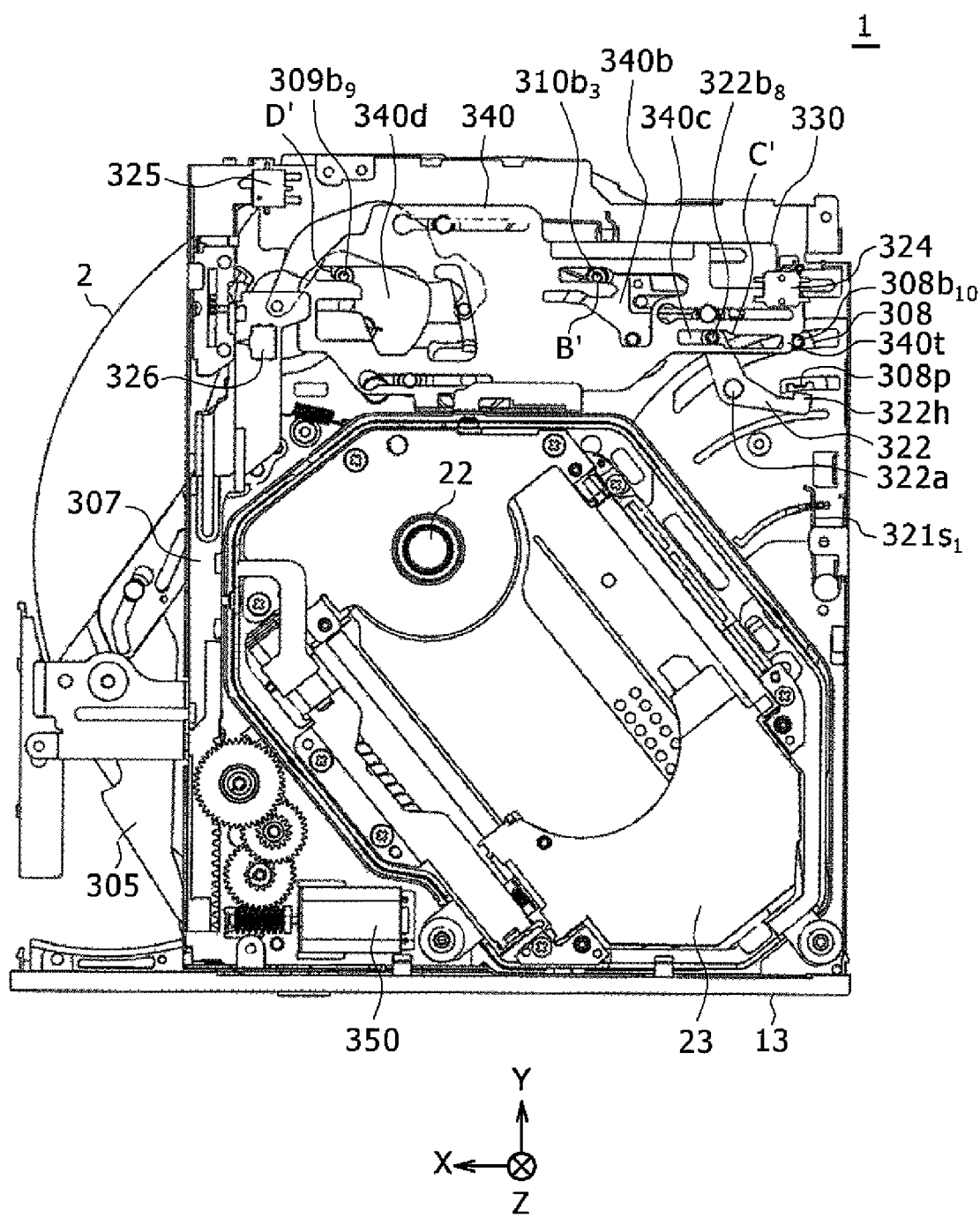
FIG. 20 is a plan view showing the undersurface of the optical disc apparatus where the optical disc is chucked as shown in FIG. 19.
Figure 21:
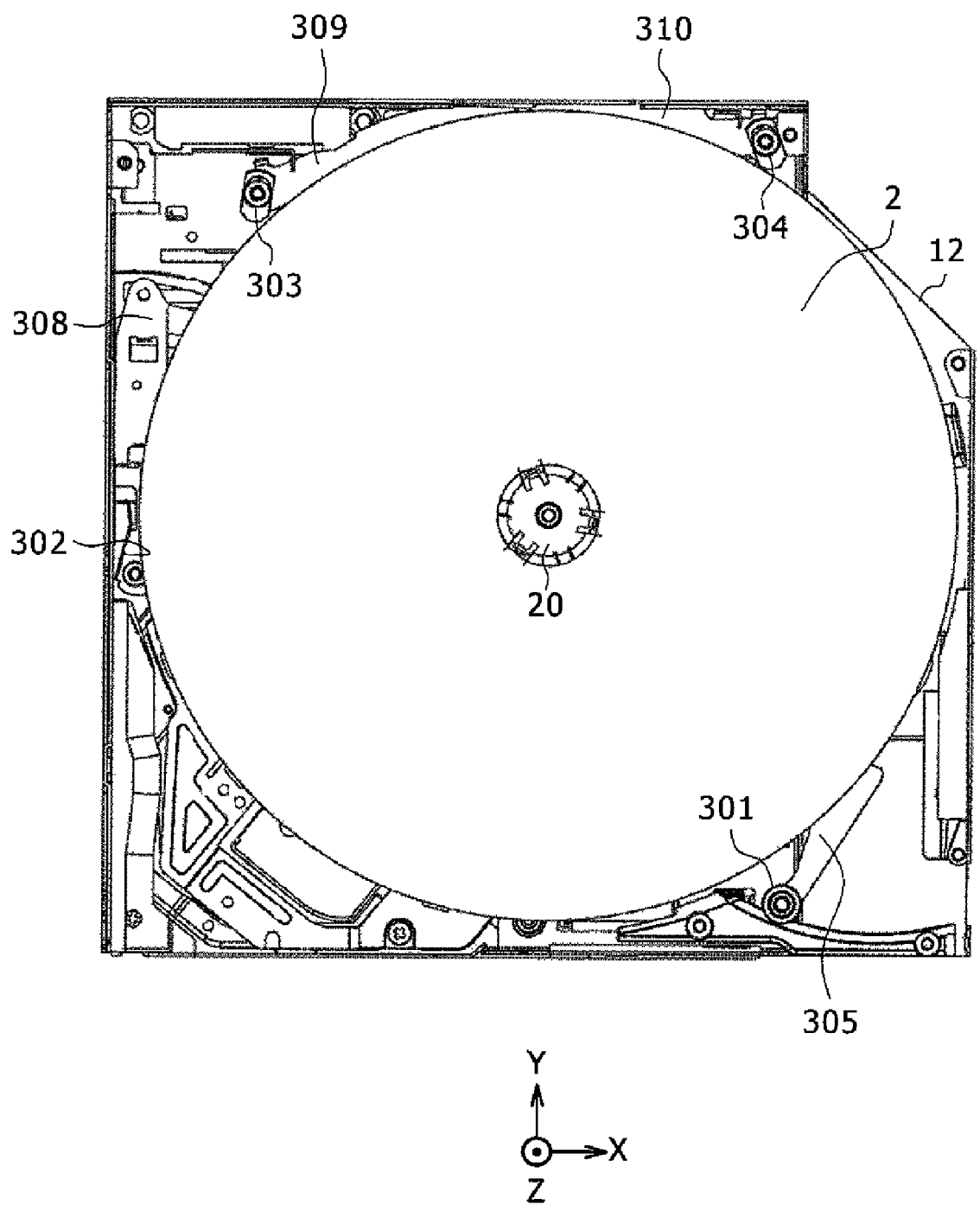
FIG. 21 is a plan view showing the disc loading side of the optical disc apparatus shown in FIG. 1 where the apparatus is ready for recording or reproduction.
Figure 22:
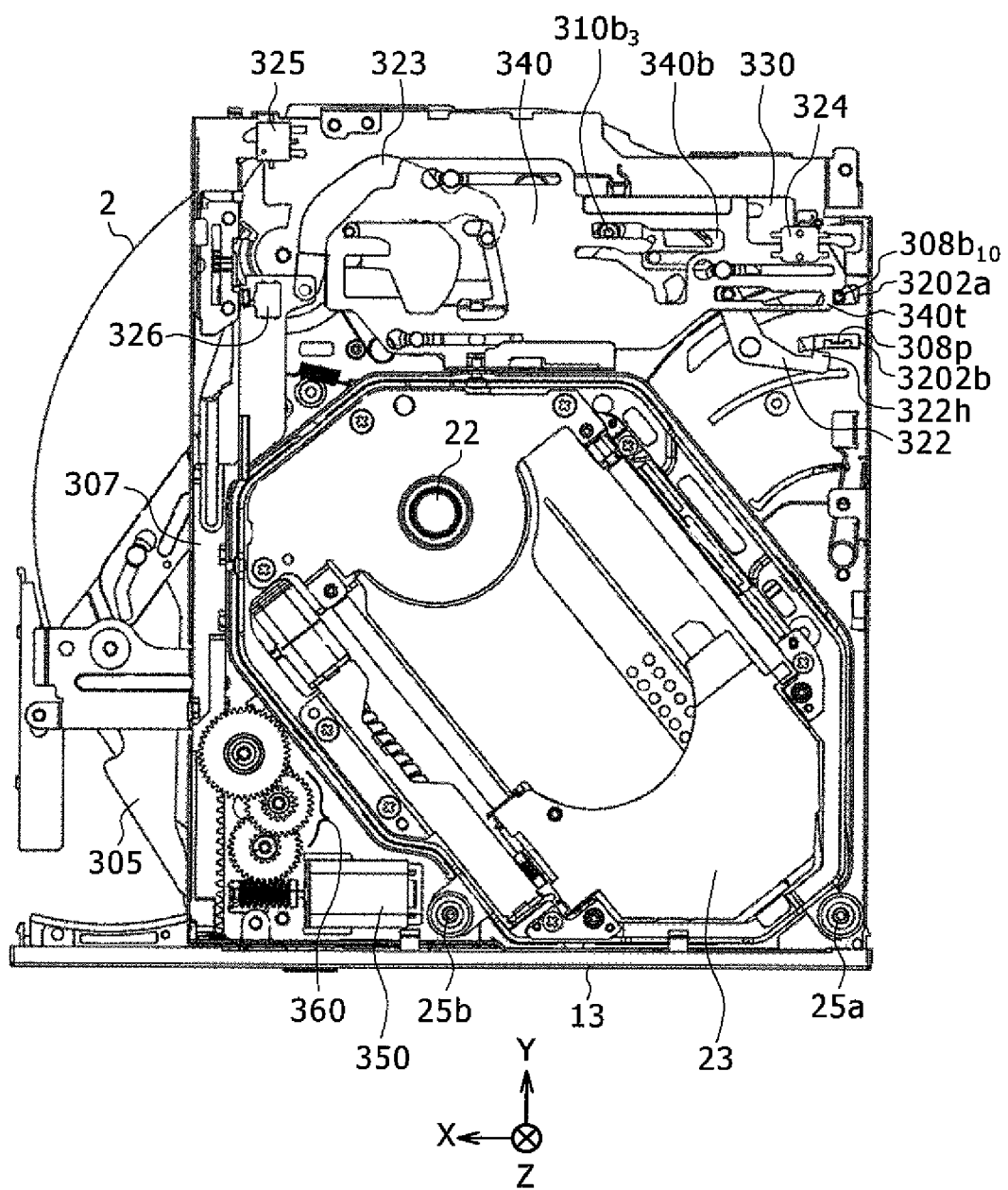
FIG. 22 is a plan view showing the undersurface of the optical disc apparatus in the standby state as shown in FIG. 21.
Figure 23:
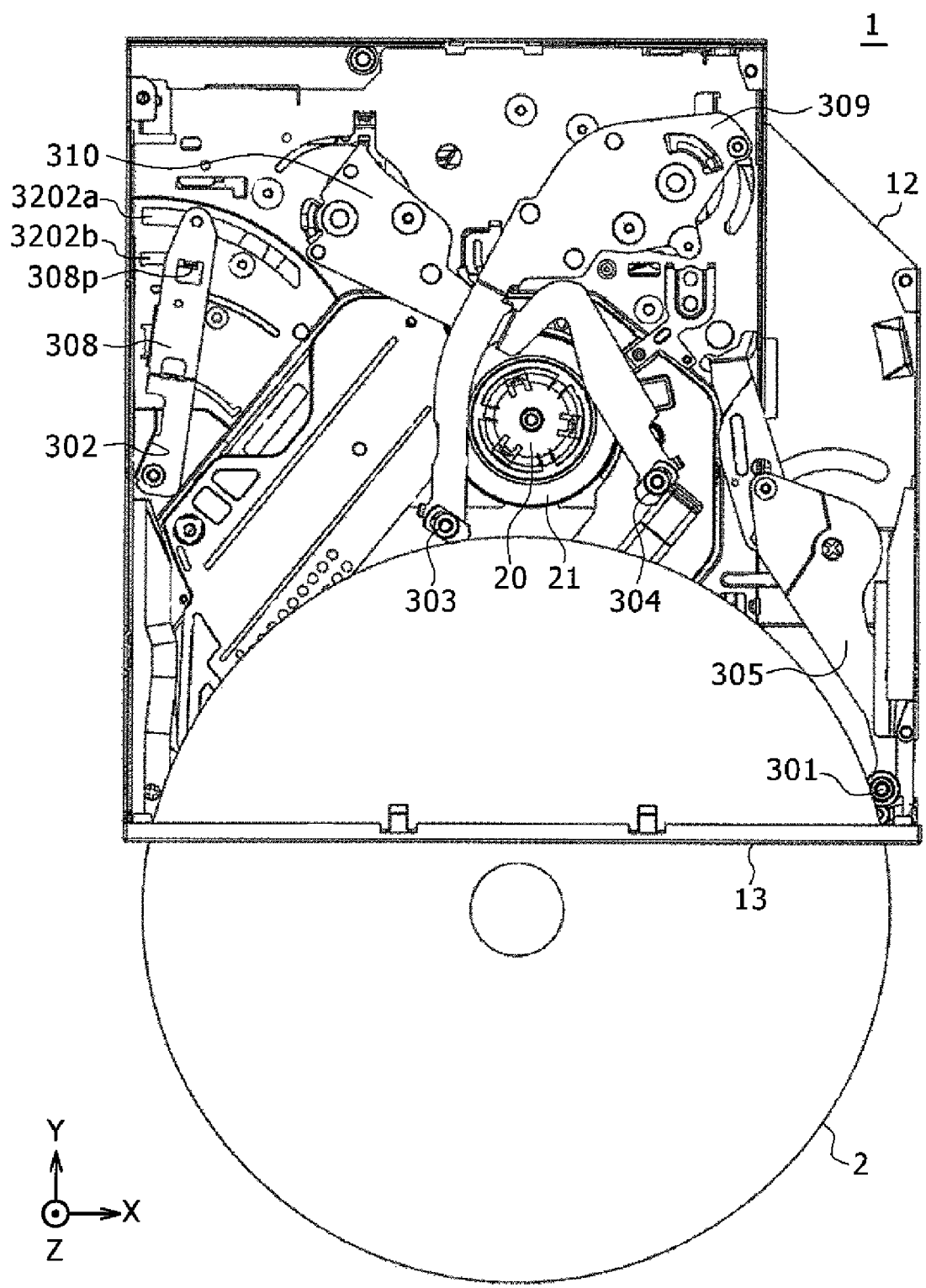
FIG. 23 is a plan view showing the disc loading side of the apparatus where the disc is being unloaded.
Figure 24:
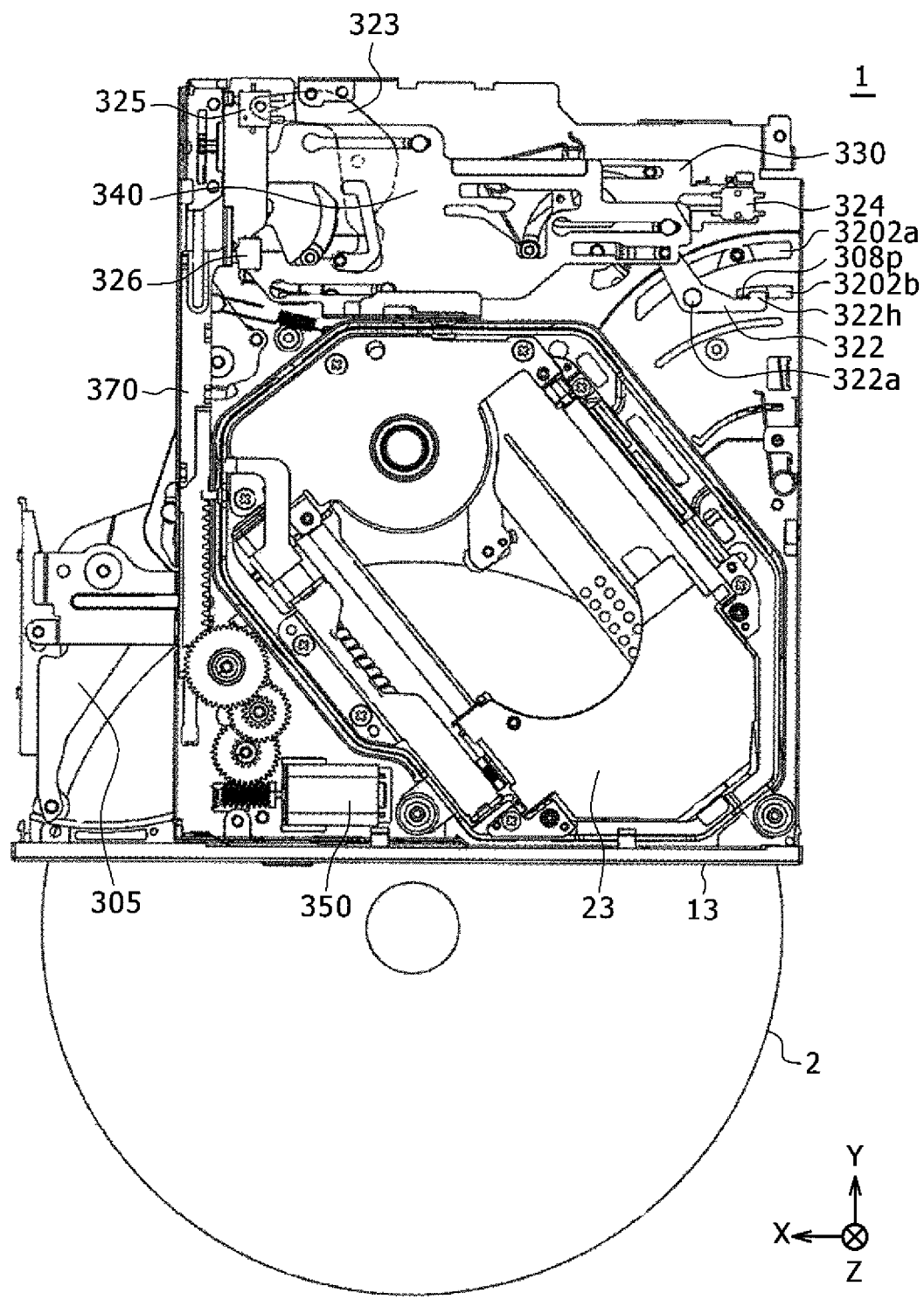
FIG. 24 is a plan view showing the undersurface of the optical disc apparatus where the disc is being unloaded as shown in FIG. 23.

FIGS. 1 to 24 illustrate an optical disc apparatus according to an embodiment of the present invention. FIG. 1 shows the appearance of the optical disc apparatus and FIG. 2 is an exploded view of the optical disc apparatus shown in FIG. 1 on a unit-by-unit basis. FIG. 3 is an exploded perspective view of a loading unit of the optical disc apparatus shown in FIG. 1 as seen obliquely from above, and FIG. 4 is an exploded perspective view of the loading unit as seen obliquely from below. FIG. 5 is a plan view of the undersurface of the loading unit and FIG. 6 is a plan view showing components on the undersurface of the loading unit. FIG. 7 is a perspective view of a function lever of the optical disc apparatus shown in FIG. 1 and FIG. 8 is a perspective view showing an eject lever and an eject plate of the optical disc apparatus shown in FIG. 1. FIG. 9 is a plan view showing the disc loading side of the apparatus shown in FIG. 1 with its top cover removed, FIG. 10 is a plan view showing the undersurface of the apparatus shown in FIG. 1 in its initial state with its bottom case removed, and FIG. 11 is a plan view showing the undersurface of the apparatus in its initial state with the bottom case and control board removed. FIGS. 12A, 12B and 12C show a second disc guide of the apparatus shown in FIG. 1 in its initial state. FIG. 13 is a plan view showing the disc loading side of the apparatus shown in FIG. 1 where the optical disc is so inserted as to come into contact with the disc lever and FIG. 14 is a plan view showing the undersurface of the apparatus shown in FIG. 1 where the disc is inserted as shown in FIG. 13. FIG. 15 is a plan view showing the disc loading side of the apparatus shown in FIG. 1 where the disc is inserted deep enough to turn on the loading switch and FIG. 16 is a plan view showing the undersurface of the apparatus where the disc is inserted as shown in FIG. 15. FIG. 17 is a plan view showing the disc loading side of the apparatus shown in FIG. 1 where the optical disc is pulled into the apparatus by a loading motor and positioned and FIG. 18 is a plan view showing the undersurface of the apparatus where the disc is inserted as shown in FIG. 17. FIG. 19 is a plan view showing the disc loading side of the apparatus shown in FIG. 1 where the disc is chucked by a damper and FIG. 20 is a plan view showing the undersurface of the apparatus where the disc is chucked as shown in FIG. 19. FIG. 21 is a plan view showing the disc loading side of the apparatus shown in FIG. 1 where the apparatus is ready for recording or reproduction and FIG. 22 is a plan view showing the undersurface of the apparatus in the standby state as shown in FIG. 21. FIG. 23 is a plan view showing the disc loading side of the apparatus shown in FIG. 1 where the disc is being unloaded and FIG. 24 is a plan view showing the undersurface of the apparatus where the disc is being unloaded as shown in FIG. 23.

In FIG. 1, reference numeral 1 represents a low-profile slot-in optical disc apparatus for an optical disc with a diameter of $120 \times 10^{-3}$ m as a recording medium; 11 represents a top cover which covers the upper surface (+Z side) of the optical disc apparatus 1, 11a represents a hole in the plane of the top cover 11 and 11b represents a circular dent around the hole 11a; and 12 represents a bottom case which covers the undersurface (−Z side) of the apparatus. 13 represents a front panel of the apparatus and 13a represents a slot through which an optical disc (not shown) is loaded into the apparatus (inserted in the Y direction) and unloaded from the apparatus. 14 represents an eject button; 15 represents an LED to indicate the state of the apparatus; and 20 represents a damper which is inserted into the center hole of the optical disc to hold the optical disc in its radial direction and chuck it. The optical disc inserted or loaded into the apparatus 1 in the +Y direction is positioned and supported at plural points on its peripheral side face so that the center hole of the disc is concentric with the damper 20 inserted in the center hole from below. The damper 20 moves up in the +Z direction and enters the center hole of the optical disc thus supported and further moves up until its tip partially protrudes from the hole 11a. At this time, the peripheral face of the center hole of the disc is pressed against the −Z side of the dent 11b and a reactive force brings the damper 20 into a prescribed position in the center hole of the disc so that the disc is chucked by the damper 20. Once the disc is chucked, it is released from the plural supporting points on its peripheral side face. After the disc is chucked, it moves down in the −Z direction together with the damper 20 and gets ready to rotate for recording or reproduction.

In the explanation given below, the same elements as shown in FIG. 1 are designated by the same reference numerals as in FIG. 1.

FIG. 2 is an exploded view showing the optical disc apparatus 1 shown in FIG. 1 on a unit-by-unit basis.

In FIG. 2, 22 represents a spindle motor 20 which rotates the optical disc (not shown); 20 represents the damper 20 fixed concentrically over the rotary part of the spindle motor 22; 21 represents a turntable which is disposed over the rotary part of the spindle motor 22 concentrically around the damper 20 to support the plane (surface for recording or reproduction) of the disc around its center hole with the damper 20 inserted in the center hole; 23 represents an optical pickup which moves almost in the radial direction of the disc and irradiates the disc surface with a laser beam for recording or reproduction; 24 represents a mechanical deck on which the spindle motor 22, the optical pickup 23, a moving/guiding mechanism (not shown) for movement in a virtually radial direction of the disc and so on are fixed; 25a and 25b represent dampers disposed on the periphery of the mechanical deck member 24; and 200 represents a traverse unit including the mechanical deck member 24, damper 20, turntable 21, spindle motor 22, optical pickup 23 and moving/guiding mechanism. The traverse unit 200 turns on the dampers 25a and 25b as fulcrums with respect to a reference plane inside the apparatus 1, and moves up the damper 20 in the +Z direction to chuck the disc and after chucking, moves down the damper 20 in the −Z direction to make the disc ready to rotate for recording or reproduction.

In the figure, 320 represents a chassis as the base of the apparatus and 320a represents a space in the chassis 320 in which the traverse unit 200 is fitted; 301 represents an insert roller as a first disc guide; 305 represents an insert arm as a first arm member which has the insert roller 301 rotatably provided thereon and can turn on a fulcrum on the chassis 320; 302 represents a disc guide as a second disc guide having a plane opposite to the −X side face of the optical disc; 308 represents a disc guide L as a member which includes the disc guide part 302 and can turn on a fulcrum on the chassis 320; 307 represents a disc guide F which guides the −X side face of the disc being inserted into the apparatus through the slot 13a of the front panel 13; 303 represents an eject roller as a third disc guide; 309 represents an eject arm as a second arm member which has the eject roller 303 rotatably provided thereon and can turn on a fulcrum on the chassis 320; 304 represents a disc roller as a fourth disc guide; 310 represents a disc lever as a lever member which has the disc roller 304 rotatably provided thereon and can turn on a fulcrum on the chassis 320; 300 represents a loading unit which has, on the chassis 320, the insert roller 301, insert arm 305, disc guide part 302, disc guide L 308, disc guide F 307, eject roller 303, eject arm 309, disc roller 304, disc lever 310 and son on and loads the optical disc into the apparatus or unloads or ejects the disc from the apparatus. As the optical disc is inserted through the slot 13a of the front panel 13 and its end face contacts the disc roller 304 and the disc lever 310 turns on the fulcrum on the chassis, a loading switch (not shown) turns on and a loading motor (not shown) turns on to turn the insert arm 305 on the fulcrum on the chassis 320. The insert roller 301 pushes the end face of the optical disc and brings the disc into the apparatus (loading). In this loading movement of the disc, the −X side face of the disc is contact with, and supported by, the inner surface of the disc guide F 307 and in a moving zone near the spot where loading movement is finished, the −X side face is in contact with, and supported by, the disc guide part 302 of the disc guide L308. 40 represents a control board which includes a motor driver circuit for driving the spindle motor 22 and loading motor, a laser driver circuit for driving the laser diode of the optical pickup, a signal processing circuit for demodulating reproduction signals from a reflected laser beam of the optical pickup, a control circuit for controlling the whole apparatus including the motor driver circuit, laser driver circuit and signal processing circuit, and a sensor switch which detects operation of the apparatus. The transverse unit 200 turns on fulcrums, namely the dampers 25a and 25b, on the chassis 320, in a plane vertical to the plane (XY plane) of the chassis 320.

In the optical disc apparatus 1, the transverse unit 200, loading unit 300 and control board 40 and so on are located in the inner space surrounded by the top cover 11, bottom case 12 and front panel 13.

In the explanation given below, the same elements shown in FIG. 2 are designated by the same reference numerals as in FIG. 2.

FIGS. 3 and 4 are exploded perspective views of the loading unit 300 of the optical disc apparatus 1; FIG. 3 shows the unit as seen obliquely from above; and FIG. 4 shows it as seen obliquely from below.

In FIGS. 3 and 4, 306 represents an action lever; 305a represents a fulcrum for turn of the insert arm 305; 306a represents a fulcrum for turn of the action lever 306; 308a represents a fulcrum for turn of the disc guide L 308; 309a represents a fulcrum for turn of the eject arm 309; and 310a represents a fulcrum for turn of the disc lever 310. $306c_1$ represents a cam groove in the action lever 306 (hereinafter called cam groove 1 of the action lever 306); $306b_5$ represents a pin on the −Z side of the action lever 306 (hereinafter called pin 5); $305b_4$ represents a pin on the −Z side of the insert arm 305 to engage with the cam groove 1 ($306c_1$) of the action lever 306 (hereinafter called pin 4); 308p represents a projection on the −Z side of the disc guide L 308; $308b_{10}$ represents a pin on the −Z side of the disc guide L (hereinafter called pin 10); $309b_1$ represents a pin on the −Z side of the eject arm 309 (hereinafter called pin 1); $309b_2$ represents a pin on the −Z side of the eject arm 309 (hereinafter called pin 2); 309b g represents a pin on the −Z side of the eject arm 309 (hereinafter called pin 9); 310p represents a projection on the −Z side of the disc lever 310; and $310b_3$ represents a pin on the −Z side of the disc lever 310 (hereinafter called pin 3). $321s_1$, $321s_2$, and $321s_3$ represent torsion coil springs whose resilience widens the distance between spring ends; 322 represents a lock arm which locks the projection 308p of the disc guide L308; 322a represents a fulcrum for turn of the lock arm 322; 325a represents a damper shaft on the chassis 320 to which the damper 25a is fitted; and 325b represents a damper shaft on the chassis 320 to which the damper 25b is fitted. The dampers 25a and 25b are respectively fitted to the damper shafts 325a and 325b on the periphery of the mechanical deck member 24 of the traverse unit 200 between the mechanical deck member 24 and the chassis 320. The lock arm 322 is fitted turnably on the fulcrum 322a on the chassis 320. On the disc guide L308, the distance of the projection 308p from the fulcrum 308a is longer than the distance from the fulcrum 308a to the disc guide part 302.

340 represents a cam slider as a cam member which engages with the chassis 320 and moves in the +X and −X directions; 340e represents a cam groove e in the cam slider 340 which enables the traverse unit 200 to turn for chucking the optical disc; 350 represents a loading motor fixed on the chassis 320 which generates a driving force to load or eject the optical disc and turn the traverse unit 200; 330 represents a switch lever which switches the loading switch (not shown) to turn on or off the loading motor 350; 360 represents a gear train which is composed of plural gears and constitutes a driving force transmission system for the loading motor 350; and 360a represents a worm gear.

370 represents a function lever which transmits the driving force of the loading motor 350 from the gear train 360; 370r represents a rack which engages with the last gear of the gear train 360; $370c_1$ represents a cam groove in the function lever 370 (hereinafter called cam groove 1 of the function lever 370); and likewise $370c_2$ represents a cam groove in the function lever 370 (hereinafter called cam groove 2 of the function lever 370). Since the guide groove in the function lever 370 engages with the guide shaft on the chassis 320, the function lever 370 can move along the plane of the chassis 320 in the +Y and −Y directions. The function lever 370 is illustrated in FIG. 7.

380a represents an eject lever; 380b represents an eject plate which transmits the driving force to eject the optical disc; and 380s represents a compression coil spring. The eject plate 380b engages with the eject lever 380a through the compression coil spring 380s. The eject lever 380a and eject plate 380b are illustrated in FIG. 8. When the optical disc apparatus 1 unloads the optical disc, the function lever 370 moves in the +Y direction, which pushes the eject lever 380a and transmits the driving force to the eject plate 380b through the compression coil spring 380s. As the driving force moves the eject plate 380b, a hole in the eject plate 380b engages with pin 2 ($309b_2$) of the eject arm 309 and the eject arm 309 turns on the fulcrum 309a and the eject roller 303 pushes the optical disc in the −Y direction to start ejection of the disc (unloading).

The switch lever 330 can move along the plane of the chassis 320 by means of a boss formed on the chassis 320 and a guide groove in the switch lever 330. The cam groove in the switch lever 330 engages with the projection 310p on the disc lever 310.

The torsion coil spring $321s_1$ exerts a resilient force between the chassis 320 and disc guide L 308 to bias the disc guide part 302 toward the center of the optical disc in its loaded position. The torsion coil spring $321s_2$ exerts a resilient force between the chassis 320 and pin 1 ($309b_1$) on the eject arm 309 to bias the eject roller 303 toward the center of the optical disc in its loaded position. The torsion coil spring $321s_3$ exerts a resilient force between the chassis 320 and pin 3 ($310b_3$) on the disc lever 310 to bias the disc roller 304 toward the center of the optical disc in its loaded position.

Through pin 4 ($305b_4$) provided thereon, the insert arm 305 obtains, from the action lever 306, a driving force to pull the optical disc into the apparatus and bring it to the loaded position. The driving force obtained from the action lever 306 is transmitted through cam groove 1 ($306c_1$) of the action lever 306 to pin 4 ($305b_4$) of the insert arm 305. Since pin 5 ($306b_5$) on the action lever 306 engages with cam groove 1 of the function lever 370, the action lever 306 receives the driving force from the function lever 370 through the engagement. The function lever 370 receives the driving force of the loading motor 350 through the worm gear 360a and gear train 360.

Since the projection 310p on the disc lever 310 engages with the cam groove of the switch lever 330, when a user inserts an optical disc into the apparatus and the peripheral side face of the disc contacts the disc roller 304 and pushes the disc roller 304 in the +Y direction, the disc lever 310 turns on the fulcrum 310a and the projection 310p moves the switch lever 330 in the −X direction. This movement of the switch lever 330 turns on the loading switch and turns on the loading motor 350 and the loading motor 350 starts rotating. The rotational driving force of the loading motor 350 is transmitted through the worm gear 360a and gear train 360 to the function lever 370. The function lever 370 transmits the driving force to the action lever 306 through pin 5 ($306b_5$) engaged with its cam groove 1 ($370c_1$) (FIG. 7). The action lever 306 transmits the driving force to the insert arm 305 through pin 4 ($305b_4$) engaged with its cam groove 1 ($370c_1$). The insert arm 305 exerts the transmitted driving force on the insert roller 301 to push the peripheral side face of the optical disc and pull the disc into the apparatus (namely load the disc).

In loading the optical disc, the insert roller 301 as the first disc guide pushes the peripheral side face of the disc by the driving force of the loading motor 350 transmitted to the insert arm 305 as the first arm member to move the disc into the apparatus 1 and at the end of loading, the insert roller 301, in a fixed position on the chassis 320, contacts the peripheral side face of the disc at a first point on the disc periphery (point $P_1$ in FIG. 17) to support the disc.

In loading the optical disc, the plane of the disc guide part 302 as the second disc guide which is opposite to the peripheral side face of the disc is biased toward the side face of the disc by the resilience of the torsion coil spring $321s_1$ engaged with the disc guide L 308 to contact the peripheral side face of the disc at a second point thereon (point $P_2$ in FIG. 17) and at the end of loading, the plane contacts the side face of the disc at the second point while restrained from moving away from the side face at the second point, to support the disc.

At the end of loading of the optical disc, the eject roller 303 as the third disc guide is biased toward the side face of the disc by the resilience of the torsion coil spring $321s_2$ engaged with the eject arm 309 as the second arm member to contact the peripheral side face of the disc at a third point thereon (point $P_3$ in FIG. 17) to support the disc and in ejecting the disc, the eject roller 303 pushes the peripheral side face of the disc at the third point and in its vicinity by the driving force of the loading motor 350 transmitted to the eject arm 309 to move the disc out of the apparatus 1.

In loading the optical disc, the disc roller 304 as the fourth disc guide is biased toward the center of the disc by the resilience of the torsion coil spring $321s_3$ engaged with the disc lever 310 to contact the peripheral side face of the disc and at the end of loading, while thus biased, it contacts the peripheral side face at a fourth point thereon (point $P_4$ in FIG. 17) to support the disc, and also it is locked with respect to the chassis 320 and refrained from moving against the resilience of the torsion coil spring $321s_3$.

In chucking the optical disc, the loading motor 350 turns the traverse unit 200 and moves up the damper 20 so that the damper 20 is put into the center hole of the disc as supported by the insert roller 301, disc guide part 302, eject roller 303 and disc roller 304. The optical disc, thus supported, is placed in a position thus determined. The position thus determined is such a position that the optical disc is centered so as to be chucked normally without a chucking failure.

In the explanation given below, the same elements shown in FIGS. 3 and 4 are designated by the same reference numerals as in FIGS. 3 and 4.

FIG. 5 is a plan view showing the undersurface of the loading unit 300 of the optical disc apparatus 1; and FIG. 6 is a plan view showing components on the undersurface of the loading unit 300.

In FIGS. 5 and 6, $320b_1$, $320b_2$, and $320b_3$ represent guide pin 1, guide pin 2 and guide pin 3 on the chassis respectively; 322h represents a hook of the lock arm 322; $322b_8$ represents a pin on the −Z side of the lock arm 322 (hereinafter called pin 8); 340a, 340b, 340c, and 340d represent cam grooves a, b, c, and d in the cam slider 340 respectively; $340g_1$, $340g_2$, and $340g_3$ respectively represent guide groove 1 engaged with the guide pin 1 ($320b_1$) on the cam slider 340, guide groove 2 engaged with the guide pin 2 ($320b_2$) on the cam slider 340, and guide groove 3 engaged with the guide pin 3 ($320b_3$) on the cam slider 340; 323 represents a control arm for driving the cam slider 340; 323a represents a fulcrum for turn of the control arm 323; $323b_6$ and $323b_7$ represent pin 6 and pin 7 on the control arm 323 respectively; $330g_1$ and $330g_2$ represent guide groove 1 and guide groove 2 in the switch lever 330 respectively; 3201a, 3201b, and 3201c each represent a boss on the chassis 320; 3202a and 3202b represent guide groove a and guide groove b of the chassis 320 respectively; and 340t represents the −X side end face of the cam slider 340. Pin 6 ($323b_6$) and pin 7 ($323b_7$) are disposed on both sides of the fulcrum 323a. The guide groove a (3202a) and guide groove b (3202b) of the chassis 320 are engaged with pin 10 ($308b_{10}$) of the disc guide L308 and the projection 308p of the disc guide L308 respectively.

The lock arm 322 is fitted turnably on the fulcrum 322a. Pin 8 (322b) on the lock arm 322 is engaged with the cam groove c (340c) of the cam slider 340. Pin 9 (309b) of the eject arm 309 is engaged with the cam groove d (340d) of the cam slider 340.

Regarding the cam slider 340, its guide groove 1 ($340g_1$) is engaged with guide pin 1 ($320b_1$) on the chassis 320, its guide groove ($340g_2$) is engaged with guide pin 2 ($320b_2$) on the chassis 320 and its guide groove 3 ($340g_3$) is engaged with guide pin 3 ($320b_3$) on the chassis 320 so that the cam slider 340 can move in the +X and −X directions along the plane of the chassis 320. Pin 3 ($310b_3$) of the disc lever 310 is engaged with the cam groove b (340b) of the cam slider 340, pin 8 ($322b_8$) of the lock arm 322 is engaged with the cam groove c (340c) of the slider, and pin 9 (309b) of the eject arm 309 is engaged with the cam groove d (340d) of the slider so that when the cam slider 340 moves, turns of the disc lever 310, lock arm 322 and eject arm 309 on their respective fulcrums are limited by the shapes of the cam groove b (340b), cam groove c (340c) and cam groove d (340d) respectively. When the cam slider 340 moves and the lock arm 322 unlocks the disc guide L308, the −X side end face 340t of the cam slider 340 contacts pin 10 ($308b_{10}$) on the disc guide L308.

Pin 7 ($323b_7$) on the control arm 323 for driving the cam slider 340 is engaged with the cam groove a (340a) of the cam slider 340 and pin 6 ($323b_6$) on the control arm 323 is engaged with the cam groove 2 ($370c_2$) of the function lever 370.

In loading the optical disc, the rotational driving force of the loading motor 350 is transmitted to the function lever 370, which moves the function lever 370 in the −Y direction and turns the action lever 306 through the cam groove 1 ($370c_1$) of the function lever 370 and pin 5 ($306b_5$) of the action lever 306. The turn of the action lever 306 is converted into a turn of the insert arm 305 through the cam groove 1 ($306c_1$) of the action lever 306 and pin 4 ($305b_4$) of the insert arm 305. As the insert arm 305 turns, the insert roller 301 at its tip pushes the peripheral side face of the optical disc to pull the disc into the apparatus (loading). Also, as the function lever 370 moves in the −Y direction, the control arm 323 turns on the fulcrum 323a through the cam groove 2 ($370c_2$) of the function lever 370 and pin 6 ($323b_6$) on the control arm 323. The turn of the control arm 323 moves the cam slider 340 in the −X direction through pin 7 ($323b_7$) on the control arm 323 and the cam groove a (340a) of the cam slider 340. The movement of the cam slider 340 limits the turn on the fulcrum 310a of the disc lever 310 with pin 3 ($310b_3$) engaged with the cam groove b (340b) of the cam slider 340 according to the shape of the cam groove b (340b), limits the turn on the fulcrum 322a of the lock arm 322 with pin 8 ($322b_8$) engaged with the cam groove c (340c) of the cam slider 340 according to the shape of the cam groove c (340c), and limits the turn on the fulcrum 309a of the eject arm 309 with pin 9 (309b g) engaged with the cam groove d (340d) of the cam slider 340 according to the shape of the cam groove d (340d) and also turns the traverse unit 200 with lifting means engaged with the cam groove e (340e) of the cam slider 340 on the dampers 25a and 25b as fulcrums so that the damper 20 and the spindle motor 22 move up in the +Z direction in order to chuck the optical disc.

In loading the optical disc, the disc roller 304 is pushed by the peripheral side face of the disc, which turns the disc lever 310 on the fulcrum 310a and moves the cam slider 340 in the −X direction. Specifically, as insertion of the disc turns the disc lever 310 and moves the cam slider 340 in the −X direction, when pin 3 ($310b_3$) on the disc lever 310 moves to position B (FIG. 5) in the cam groove b (340b) of the cam slider 340, the pin 3 ($310b_3$) contacts the +Y side face of the cam groove b (340b) (side face on the +Y side among the side faces of the cam slider 340 which form the cam groove b), which restrains its movement against the resilience of the torsion coil spring $321s_3$. This restrains the turn of the disc lever 310 and the movement of the disc roller 304 as the fourth disc guide against the resilience of the torsion coil spring $321s_3$. In other words, the position of the disc roller 304 as the fourth disc guide is thus determined. As the disc roller 304 is thus positioned, loading of the optical disc is finished. Also, in loading the disc, the eject roller 303 is pushed by the peripheral side face of the disc, which turns the eject arm 309 on the fulcrum 309a and moves the cam slider 340 in the −X direction as mentioned above. Specifically, as insertion of the disc turns the eject arm 309 and moves the cam slider 340 in the −X direction, pin 9 ($309b_g$) of the eject arm 309 moves to position D (FIG. 5) in the cam groove b (340b) of the cam slider 340. Also, in loading the disc, as the cam slider 340 moves in the −X direction as mentioned above, pin 8 ($322b_8$) on the lock arm 322 moves in the cam groove c (340c) and reaches position C (FIG. 5), then the pin 8 ($322b_8$) contacts the +Y side face of the cam groove c (340c) (side face on the +Y side among the side faces of the cam slider 340 which form the cam groove c), which restrains its movement in the Y direction. This restrains the turn of the lock arm 322 on the fulcrum 322a and causes the hook 322h of the lock arm 322 to lock the projection 308p of the disc guide L308 with a side face of the guide groove 3202b of the chassis 320. This restrains the turn of the disc guide L308 on the fulcrum 308a and determines the position of the disc guide part 302 as the second disc guide on the disc guide L308. When the disc guide part 302 is thus positioned, loading of the disc is finished.

In the explanation given below, the same elements shown in FIGS. 5 to 8 are designated by the same reference numerals as in FIGS. 5 to 8.

FIGS. 9 to 12C show the optical disc apparatus 1 with no disc loaded (this state is hereinafter called "initial state").

FIG. 9 is a plan view showing the disc loading side (+Z side) of the optical disc apparatus 1 in its initial state with the top cover 11 removed; FIG. 10 is a plan view showing the undersurface of the optical disc apparatus 1 (−Z side) in its initial state with the bottom case 12 removed; FIG. 11 is a plan view showing the undersurface of the apparatus 1 in its initial state with the bottom case 12 and control board 40 removed. FIGS. 12A, 12B and 12C show the disc guide L308 of the apparatus 1 in its initial state, in which FIG. 12A is a perspective view of the disc guide L308 and its vicinity on the disc loading side (+Z side), FIG. 12B is a perspective view of the lock arm 322 and its vicinity on the undersurface (−Z side), and FIG. 12C shows the locking mechanism of the lock arm 322 in enlarged form.

In FIG. 10, 26 represents a lead screw with a threaded surface which turns to move the optical pickup 23 in the virtually radial direction of the optical disc; 27 represents a slide motor which turns the lead screw 26; and 28a and 28b represent guide members for movement of the optical pickup 23. The lead screw 26, slide motor 27 and guide members 28a and 28b constitute a moving/guiding mechanism for the optical pickup 23. 324 represents a loading switch which turns on and off the loading motor 350; 325 represents an eject switch which detects the movement of the function lever 370 to the ejecting position; and 326 represents a mechanical mode switch which detects the movement of the function lever 370 to a position in which the apparatus is playable (ready for recording or reproduction). The loading switch 324, eject switch 325, and mechanical mode switch 326 are disposed on the control board 40. In this embodiment, the mechanical mode switch 326 has a dual-contact structure and can detect two mechanical modes.

When the optical disc apparatus 1 is in the initial state, as illustrated in FIGS. 12A to 12C, the disc guide L308 is biased by the torsion coil spring $321s_1$ and the projection 308p is pressed against the +X side end in the guide groove 3202b and locked by the hook 322h of the lock arm 322. In the initial state, the mechanical mode switch 326 indicates that the function lever 370 is not in its position for operation (play) and the loading switch 324 and the eject switch 325 are off.

In the explanation given below, the same elements shown in FIGS. 9 to 12C are designated by the same reference numerals as in FIGS. 9 to 12C.

FIGS. 13 and 14 show that the user begins to insert the optical disc into the optical disc apparatus 1 through the slot 13a of the front panel 13. FIG. 13 is a plan view showing the disc loading side (+Z side) of the apparatus 1 and FIG. 14 is a plan view showing the undersurface (−Z side) of the apparatus 1.

In FIGS. 13 and 14, 2 represents an optical disc. FIGS. 13 and 14 show that about a half of the plane of the optical disc is inserted in the apparatus 1 through the slit 13a of the front panel 13. In this state, the peripheral +Y side face of the disc contacts the eject roller 303 as the third disc guide and the disc roller 304 as the fourth disc guide, the peripheral +X side face contacts the insert roller 301 as the first disc guide, and the peripheral −X side face contacts the inner face of the disc guide F. A biasing force against insertion of the disc (toward the −Y direction) is applied to the eject roller 303 by the resilience of the torsion coil spring $321s_2$ (FIG. 4) and similarly a biasing force against insertion of the disc is applied to the disc roller 304 by the resilience of the torsion coil spring $321s_3$ (FIG. 4). In the state illustrated in FIGS. 13 and 14, the switch lever 330 has not moved yet and the loading motor 350 is not on, so the disc 2 is not automatically pulled in.

FIGS. 15 and 16 show that the loading motor 350 of the optical disc apparatus 1 is on. FIG. 15 is a plan view showing the disc loading side (+Z side) of the apparatus 1 and FIG. 16 is a plan view showing the undersurface (−Z side) thereof.

In the state shown in FIGS. 15 and 16, the turn of the disc lever 310 causes the projection 310p on the disc lever 310 to move the switch lever 330 in the −X direction and turn on the loading switch 324. As a consequence, the loading motor 350 turns on and the loading motor 350 begins rotating. The rotational driving force of the loading motor 350 is transmitted through the worm gear 360a, gear train 360 and rack 370r to the function lever 370 and consequently the function lever 370 moves in the −Y direction and transmits the driving force to the action lever 306 through pin 5 ($306b_5$) engaged with its cam groove 1 ($370c_1$). The action lever 306 transmits the driving force to the insert arm 305 through pin 4 ($305b_4$) engaged with its cam groove 1 ($306c_1$). The insert arm 305 exerts the transmitted driving force on the insert roller 301 to let it push the peripheral side face of the optical disc and pull the disc into the apparatus (loading). In other words, automatic loading of the optical disc 2 is started by the rotational driving force of the loading motor 350. The movement of the function lever in the −Y direction also turns the control arm 323 on the fulcrum 323a through the cam groove 2 ($370c_2$) of the function lever 370 and pin 6 ($323b_6$) on the control arm 323. The turn of the control arm 323 moves the cam slider 340 in the −X direction through pin 7 ($323b_7$) on the control arm 323 and the cam groove a (340a) of the cam slider 340. While these components work as mentioned above, loading of the optical disc 2 progresses.

FIGS. 17 and 18 show that in the optical disc apparatus 1, loading of the optical disc 2 is finished, or the optical disc 2 is in a prescribed position before chucking (hereinafter called "loaded state"). FIG. 17 is a plan view showing the disc loading side (+Z side) of the apparatus 1 and FIG. 18 is a plan view showing the undersurface (−Z side) thereof.

In the loaded state of the optical disc apparatus 1, as shown in FIG. 17, the insert roller 301 as the first disc guide contacts the peripheral side face of the optical disc 2 at the first point $P_1$ thereon adjacent to the front panel 13 to support the disc 2, the disc guide part 302 as the second disc guide contacts the peripheral −X side face of the disc 2 at the second point $P_2$ thereon to support the disc 2, the eject roller 303 as the third disc guide contacts the peripheral side face of the disc 2 at the third point $P_3$ thereon to support the disc 2, and the disc roller 304 as the fourth disc guide contacts the peripheral side face of the disc 2 at the fourth point $P_4$ thereon to support the disc 2. At this time, since the disc lever 310 with the disc roller 304 provided thereon is restrained by the cam slider 340, the disc roller 304 is restrained from moving against the resilience of the torsion coil spring $321s_3$; and also since the disc guide L308 is locked by the lock arm 322 which turns on the fulcrum 322a on the chassis 320, the disc guide part 302 supports the disc while restrained from moving away from the side face of the disc at the second point $P_2$. In other words, at the end of loading, pin 3 ($310b_3$) on the disc lever 310 is at position B in the cam groove b (340b) of the cam slider 340 and in contact with the +Y side face of the cam groove b (340b) (side face on the +Y side among the side faces of the cam slider 340 which form the cam groove b) and thus restrained from moving in the +Y direction. This restrains the turn of the disc lever 310 and restrains the disc roller 304 (fourth disc guide) from moving way from the peripheral side face of the disc at the fourth point $P_4$ thereon. In other words, the disc roller 304 as the fourth disc guide is biased by the resilience of the torsion coil spring $321s_3$ and in contact with the side face of the disc at the fourth point $P_4$ while restrained from moving away from the side face. Furthermore, pin 8 ($322b_8$) on the lock arm 322 is at position C in the cam groove c (340c) and in contact with the +Y side face of the cam groove c (340c) (side face on the Y side among the side faces of the cam slider 340 which form the cam groove c) and restrained from moving in the +Y direction. This restrains the turn of the lock arm 322 on the fulcrum 322a and causes the hook 322h of the lock arm 322 to lock the projection 308p of the disc guide L308 with a side faces of the guide groove 3202b in the groove 3202b on the chassis 320. This in turn restrains the turn of the disc guide L308 on the fulcrum 308a and restrains the disc guide part 302 as the second disc guide on the disc guide L308 from moving away from the peripheral side face of the disc at the second point $P_2$. In other words, the disc guide part 302 as the second disc guide is biased by the resilience of the torsion coil spring $321s_1$ and in contact with the peripheral side face of the disc at the second point $P_2$ while restrained from moving away from the side face. Also, pin 9 (309b g) of the eject arm 309 moves to position D in the cam groove d (340d) of the cam slider 340 and at position D it is biased by the resilience of the torsion coil spring $321s_2$ and the eject roller 303 as the third disc guide is in contact with the peripheral side face of the disc at the third point $P_3$.

In the loaded state, the insert roller 301 as the first disc guide in contact with the peripheral side face of the disc 2 at the first point $P_1$, the disc guide part 302 as the second disc guide in contact with the peripheral side face of the disc 2 at the second point $P_2$, and the disc roller 304 as the fourth disc guide in contact with the peripheral side face of the disc 2 at the fourth point $P_4$ hold the disc 2 in such a position that it can be chucked normally without a chucking failure.

After the loaded state, the optical disc apparatus 1 enters the stage of chucking the optical disc 2 thus placed in the prescribed position.

FIGS. 19 and 20 show that in the optical disc apparatus 1, the optical disc 2 is chucked by the damper 20 (this state is hereinafter called "chucked state"). FIG. 19 is a plan view showing the disc loading side (+Z side) of the apparatus 1 and FIG. 20 is a plan view showing the undersurface (−Z side) thereof.

In chucking the optical disc 2, the loading motor 350 rotates and its rotational driving force is transmitted to the function lever 370 and the movement of the function lever 370 is converted into further movement of the cam slider 340 in the −X direction through the control arm 323 and this movement of the cam slider 340 turns the traverse unit 200 on the dampers 25a and 25b as fulcrums with its lifting means engaged with the cam groove e (340e) in the cam slider 340. The turn of the traverse unit 200 moves up the damper 20 in the +Z direction so that the damper 20 is accurately put in the center hole of the disc 2 in the prescribed position. As the damper 20 moves up, part of its tip protrudes from the hole 11a (FIG. 1) of the top cover 11. At this time, the surface of the disc 2 around its center hole is pressed against the −Z side of the dent 11b (FIG. 1) of the top cover 11 and due to the reactive force, the damper 20 reaches a prescribed position in the center hole of the disc 2 and so that the disc 2 is placed on the turntable 21 and chucked by the damper 20. When the disc 2 is thus chucked, with the damper 20 in the center hole of the disc 2, due to the movement of the cam slider 340 as a cam member, the disc guide L308 is released from the lock arm 322 and turned on the fulcrum 308a against the resilience of the torsion coil spring $321s_1$ and then locked by the cam slider 340 at the movement position; as a consequence, the disc guide part 302 (second disc guide) moves to an escape position and the disc guide part 302 is held in the escape position away from the peripheral side face of the disc at the second point ($P_2$ in FIG. 17). In other words, in chucking the disc 2, due to the further movement of the cam slider 340 in the −X direction, a pin 8 (322b) on the lock arm 322 moves in the +X direction farther than position C in the cam groove c (340c) and the restriction on its movement in the +Y direction is removed. This enables the lock arm 322 to turn on the fulcrum 322a through the cam slider 340. Due to the turn of the lock arm 322, the hook 322h of the lock arm 322 unlocks the projection 308p of the disc guide L308 in the guide groove 3202b of the chassis 320 and also releases the disc guide L308 to permit it to turn on the fulcrum 308a of the disc guide L308, so that the disc guide part 302 (second disc guide) on the disc guide L308 can move away from the peripheral side face of the optical disc at the second point $P_2$. Due to the above further movement of the cam slider 340, the disc guide part 302 as unlocked as mentioned above moves away from the peripheral side face of the disc at the second point $P_2$. In other words, as the cam slider 340 further moves in the −X direction, the −X side end face 340t of the cam slider 340 contacts a pin 10 ($308b_{10}$) of the disc guide L308 and pushes it. This turns the disc guide L308 on the fulcrum 308a against the resilience of the torsion coil spring $321s_1$ and moves the disc guide part 302 away from the peripheral side face of the disc at the second point $P_2$ to an escape position. Even after the disc guide part 302 moves to the escape position, the end face 340t of the cam slider 340 remains in contact with pin 10 ($308b_{10}$) of the disc guide L308. Consequently, the disc guide L302 is held in its escape position.

Also, due to the above further movement of the cam slider 340, the eject roller 303 in contact with the peripheral side face of the disc 2 at the third point $P_3$ and the disc roller 304 in contact with the peripheral side face of the disc 2 at the fourth point $P_4$ move from the peripheral side face of the disc 2 at their respective points to the respective escape positions. In other words, as the cam slider 340 further moves in the −X direction as mentioned above, a pin 9 (309b) on the eject arm 309 moves from position D (FIG. 18) to position D' in the cam groove d (340d) and in response to the above movement, the eject arm 309 turns on the fulcrum 309a against the resilience of the torsion coil spring $321s_2$ and moves the eject roller 303 away from the peripheral side face of the disc 2 at the third point $P_3$ to its escape position. Furthermore, a pin 3 ($310b_3$) on the disc lever 310 moves from position B (FIG. 18) to position B' in the cam groove b (340b) and in response to the above movement, the disc lever 310 turns on the fulcrum 310a against the resilience of the torsion coil spring $321s_3$ and moves the disc roller 304 away from the peripheral side face of the disc 2 at the fourth point $P_4$ to its escape position. FIGS. 19 and 20 show that the disc guide part 302, eject roller 303 and disc roller 304 are in their respective escape positions.

When the optical disc apparatus 1 chucks the optical disc 2, the insert arm 305 turns on the fulcrum 305a through the action lever 306 with movement of the function lever 370 as driven by the loading motor 350, so that the insert roller 301 moves away from the peripheral side face of the disc 2 at the first point $P_1$ to its escape position. FIGS. 19 and 20 also show that the insert roller 303 is in its escape position.

FIGS. 21 and 22 show that the optical disc apparatus 1 is ready for recording or reproduction (this state is hereinafter called "playable state"). FIG. 21 is a plan view showing the disc loading side (+Z side) of the apparatus 1 and FIG. 22 is a plan view showing the undersurface (−Z side) thereof.

After chucking the disc as shown in FIGS. 19 and 20, the loading motor 350 further rotates and the function lever 370 further moves in the −Y direction and the mechanical mode switch 326 detects that the function lever 370 has moved to a position which makes the optical disc apparatus 1 playable and the optical disc apparatus 1 thus becomes playable. In the playable state, while the cam slider 340 has moved farther in the −X direction than in the chucked state shown in FIGS. 19 and 20 and the function lever 370 has moved farther in the −Y direction than in the chucked state, the disc guide part 302, eject roller 303, disc roller 304 and insert roller 303, which are in their escape positions, are held almost in the same positions as in the chucked state.

FIGS. 23 and 24 show that the user pushes the eject button 14 and the optical disc 2 is being unloaded from the optical disc apparatus 1. FIG. 23 is a plan view showing the disc loading side (+Z side) of the apparatus 1 and FIG. 24 is a plan view showing the undersurface (−Z side) thereof.

As the eject button 14 is pushed, an electrical signal is sent to the control circuit of the control board 40 and the control circuit controls the motor driver circuit to stop rotation of the spindle motor 22, then the loading motor 350 rotates in the direction opposite to the direction of rotation for loading. The driving force of the loading motor 350 moves the function lever 370 in the +Y direction. Due to the movement of the function lever 370 in the +Y direction, mechanical components of the optical disc apparatus 1 including the cam slider 340 are activated in directions opposite to the directions for loading. When the function lever 370 moves in the +Y direction and reaches the eject position, the eject switch 325 detects that the function lever 370 has moved to the eject position and this detection signal is sent to the control circuit and the control circuit controls the motor driver circuit to stop rotation of the loading motor 350. When the function lever 370 moves in the +Y direction and reaches the eject position, the eject lever 380a is pushed and the driving force is transmitted to the eject plate 380b through the compression coil spring 380s. The driving force moves the eject plate 380b, engages it with the eject arm 309, and turns the eject arm 309 on the fulcrum 309a in the disc unloading direction. The turn of the eject arm 309 causes the eject roller 303 to push the optical disc 2 in the −Y direction. Consequently the disc 2 is unloaded from the apparatus 1.

According to the optical disc apparatus 1 as an embodiment of the present invention, at the end of loading and before chucking, the position of the optical disc 2 is determined by the insert roller 301 placed in its fixed position, the disc guide part 302 fixed and restrained from moving in the escape direction, and the disc roller 304 biased toward the center of the disc by the resilience of the torsion coil spring 321s₃ and restrained from moving against the resilience of the torsion coil spring 321s₃, so even if an external force such as vibration or impact is given to the optical disc apparatus 1 or if the apparatus 1 is brought into such a position that its weight concentrates on the forward side in the disc loading direction, the disc is securely held in the above determined position at the end of loading. As a result, it is possible to ensure that the disc is chucked normally without a chucking failure and the apparatus operates reliably.

According to the present invention, in an optical disc apparatus, an optical disc once placed in a prescribed position is securely held in that position before being chucked, even if an external force such as vibration or impact is given to the optical disc apparatus or if the apparatus is brought into such a position that its weight concentrates on the forward side in the disc loading direction, so it is ensured that the disc is chucked normally without a chucking failure and the apparatus operates reliably.

The present invention may be embodied in forms other than the above embodiment without departing from the spirit or essential characteristics thereof. The above embodiment is therefore merely illustrative in every aspect and not restrictive. The scope of the invention is defined by the appended claims. All modifications and variations that fall within metes and bounds of the claims, or equivalence of such metes and bounds thereof fall within the scope of the present invention.

What is claimed is:

1. An optical disc apparatus in which a loaded optical disc is chucked by a damper and turned for recording or reproducing information, comprising:
    a chassis as a base for the apparatus;
    a first disc guide, at the end of loading of the optical disc, placed in a fixed position on the chassis, contacting a peripheral side face of the optical disc at a first point thereon to support the disc;
    a second disc guide having a plane opposite to the side face of the optical disc, at the end of loading of the optical disc, contacting the peripheral side face of the optical disc at a second point thereon to support the disc while restrained from moving away from the side face;
    a third disc guide, at the end of loading of the optical disc, contacting the peripheral side face of the optical disc at a third point thereon to support the disc while biased by resilience of a spring; and
    a fourth disc guide, at the end of loading of the optical disc, contacting the peripheral side face of the optical disc at a fourth point thereon to support the disc while biased by resilience of a spring, and being restrained from moving against the resilience of the spring at the contact point;
    wherein the damper is put into a center hole of the optical disc supported by the first, second, third and fourth disc guides to chuck the optical disc.

2. An optical disc apparatus in which a loaded optical disc is chucked by a clamper, turned by a spindle motor and irradiated with a laser beam from an optical pickup for recording or reproducing information, comprising:
    a chassis as a base for the apparatus;
    a traverse unit including the spindle motor, the optical pickup, and a mechanism for moving the optical pickup in a virtually radial direction of the optical disc and turnable on a fulcrum on the chassis in a plane virtually vertical to the chassis's plane to chuck the optical disc;
    a loading motor fixed on the chassis and generating a driving force to turn the traverse unit to load, eject and chuck the optical disc;
    a first disc guide provided on a first arm member turnable on a fulcrum on the chassis, and in loading the optical disc, pushing a peripheral side face of the optical disc by the driving force of the loading motor transmitted to the first arm member to move the optical disc into the optical disc apparatus, and at the end of loading, placed in a fixed position on the chassis, contacting a peripheral side face of the optical disc at a first point thereon to support the disc;
    a second disc guide provided on a member turnable on a fulcrum on the chassis, having a plane opposite to the peripheral side face of the optical disc, and in loading the optical disc, the plane being biased toward the side face of the optical disc by resilience of a spring engaged with the member to contact the peripheral side face of the optical disc at a second point thereon, and at the end of loading, the plane contacting the peripheral side face of the optical disc at the second point to support the disc while restrained from moving away from the side face at the second point;
    a third disc guide provided on a second arm member turnable on a fulcrum on the chassis, and at the end of loading of the optical disc, contacting the peripheral side face of the optical disc at a third point thereon to support the disc while biased toward the side face of the optical disc by resilience of a spring engaged with the second arm member, and in ejecting the optical disc, pushing the peripheral side face of the optical disc at the third point and in its vicinity by the driving force of the loading motor transmitted to the second arm member to move the optical disc out of the optical disc apparatus; and a fourth disc guide provided on a lever member turnable on a fulcrum on the chassis, and in loading the optical disc, being biased toward the center of the optical disc by resilience of a spring engaged with the lever member to contact the peripheral side face of the optical disc, and at the end of loading, contacting the peripheral side face of the optical disc at a fourth point thereon while biased by the resilience to support the optical disc, and being restrained from moving against the resilience of the spring locked to the chassis;

wherein, in chucking the optical disc, the loading motor turns the traverse unit to move up the damper and put the damper into a center hole of the optical disc supported by the first, second, third and fourth disc guides.

3. The optical disc apparatus according to claim 1, wherein at the end of loading, as the member with the second disc guide provided thereon is locked by a lock arm turning on a fulcrum on the chassis, the second disc guide supports the optical disc while restrained from moving away from the side face and after that, in chucking the optical disc, while the damper is placed in the optical disc's center hole, the member is released from the lock arm by movement of a cam member engaged with the chassis, turned on the fulcrum against the resilience of the spring and locked by the cam member at a turning position, and thus the second disc guide moves to an escape position and is held in the escape position away from the peripheral side face of the optical disc at the second point thereon.

4. The optical disc apparatus according to claim 1, wherein at the end of loading, the fourth disc guide is restrained from moving against the resilience of the spring by the lever member with the fourth disc guide provided thereon being restrained by the cam member engaged with the chassis.

5. The optical disc apparatus according to claim 2, wherein at the end of loading, as the member with the second disc guide provided thereon is locked by the lock arm turning on the fulcrum on the chassis and an opening in a plane of the chassis, the second disc guide supports the optical disc while restrained from moving away from the side face at the second point and after that, in chucking the optical disc, while the damper is placed in the optical disc's center hole, the member is released from the lock arm by movement of a cam member engaged with the chassis, turned on the fulcrum against the resilience of the spring and locked by the cam member at a turning position, the second disc guide moves to an escape position and is held in the escape position away from the peripheral side face of the optical disc at the second point thereon.

6. The optical disc apparatus according to claim 2, wherein at the end of loading, as a pin on the lever member with the fourth disc guide provided thereon contacts an end face of a cam groove of the cam member engaged with the chassis, the fourth disc guide is restrained from moving against the resilience of the spring.

7. The optical disc apparatus according to claim 1, wherein at the end of loading, the position of the optical disc in a disc plane is determined by the first, second and fourth disc guides.

8. The optical disc apparatus according to claim 2, wherein at the end of loading, the position of the optical disc in a disc plane is determined by the first, second and fourth disc guides.

9. The optical disc apparatus according to claim 5, wherein at the end of loading, with a projection on the member inserted in the opening, the member with the second disc guide provided thereon is locked by a hook of the lock arm and the opening, and after that, in chucking the optical disc, with the damper in the optical disc's center hole, the cam member unlocks the projection by movement of the cam member by turning the lock arm on the fulcrum by the driving force of the loading motor.

10. The optical disc apparatus according to claim 9, wherein a distance of the projection on the member from a fulcrum on the chassis is longer than a distance from the fulcrum to the second disc guide.

* * * * *